United States Patent
Leon Guerrero et al.

(10) Patent No.: US 11,829,579 B2
(45) Date of Patent: Nov. 28, 2023

(54) IMMERSIVE, MULTI-STATE UNI-CARD

(71) Applicant: Google LLC, Mountain View, CA (US)

(72) Inventors: Maurio Meika Leon Guerrero, San Francisco, CA (US); Wanfang Diao, San Bruno, CA (US); Christopher Daniel Ramirez, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/075,881

(22) Filed: Dec. 6, 2022

(65) Prior Publication Data

US 2023/0176711 A1 Jun. 8, 2023

Related U.S. Application Data

(63) Continuation of application No. PCT/US2021/062154, filed on Dec. 7, 2021.

(51) Int. Cl.
| | |
|---|---|
| *G06F 3/0482* | (2013.01) |
| *G06F 9/451* | (2018.01) |
| *G06F 16/9538* | (2019.01) |
| G06F 3/04845 | (2022.01) |
| G06F 3/0488 | (2022.01) |

(52) U.S. Cl.
CPC ............ *G06F 3/0482* (2013.01); *G06F 9/451* (2018.02); *G06F 16/9538* (2019.01); *G06F 3/0488* (2013.01); *G06F 3/04845* (2013.01)

(58) Field of Classification Search
CPC .... G06F 3/0482; G06F 9/451; G06F 16/9538; G06F 3/04845; G06F 3/0488

USPC .......................................................... 715/815
See application file for complete search history.

(56) References Cited

U.S. PATENT DOCUMENTS

| | | | | |
|---|---|---|---|---|
| 11,068,130 B1* | 7/2021 | Neelisetti | ............. | G06F 3/0481 |
| 2014/0164938 A1* | 6/2014 | Petterson | ................ | G06F 3/048 |
| | | | | 715/739 |
| 2014/0189592 A1* | 7/2014 | Benchenaa | ........... | G06F 3/0482 |
| | | | | 715/835 |
| 2014/0365126 A1* | 12/2014 | Vulcano | ................. | G01C 21/36 |
| | | | | 701/538 |
| 2015/0100894 A1* | 4/2015 | Kumar | .................. | H04L 67/535 |
| | | | | 715/752 |

(Continued)

OTHER PUBLICATIONS

Bing, "Carousel Tallest Mountains", https://www.bing.com/search?q=carousel%20tallest%20mountains &qs=n&form=QBRE&=0%25eManage%20Your%20Search%20History%25E&sp=-1&pq=carousel%20tallest%20mountains&sc=5-26&sk=&cvid=FA715B3AFD9E 471080A14676CFF5797B&ghsh=0&ghacc=0&ghpl=, retrieved on Sep. 15, 2021, 9 pages.

(Continued)

*Primary Examiner* — William D Titcomb
(74) *Attorney, Agent, or Firm* — Dority & Manning, P.A.

(57) ABSTRACT

Systems and methods for providing a uni-card interface can provide for an interactive dynamic interface for providing information to a user. The uni-card interface may include a multi-state interface that can provide increasingly more detailed information upon each interaction. For example, the uni-card interface can provide a first state with condensed information, a second state with expanded information, and a third state with immersive information.

20 Claims, 21 Drawing Sheets

(56) References Cited

U.S. PATENT DOCUMENTS

| | | | | |
|---|---|---|---|---|
| 2015/0301792 | A1* | 10/2015 | Prosserman | H04N 21/21805 |
| | | | | 700/94 |
| 2016/0196006 | A1* | 7/2016 | Doan | G06F 3/0488 |
| | | | | 715/779 |
| 2016/0360336 | A1* | 12/2016 | Gross | H04W 4/025 |
| 2017/0250930 | A1* | 8/2017 | Ben-Itzhak | G06F 3/0488 |
| 2017/0269795 | A1* | 9/2017 | Richman | H04N 21/431 |
| 2017/0269804 | A1* | 9/2017 | Richman | H04N 21/466 |
| 2017/0329614 | A1* | 11/2017 | Schon | G06F 3/0481 |
| 2019/0250773 | A1* | 8/2019 | Miyaki | A63F 13/50 |
| 2019/0324825 | A1* | 10/2019 | Schwartz | G06F 3/04842 |
| 2021/0097105 | A1* | 4/2021 | Al Majid | G06F 16/738 |
| 2022/0100812 | A1* | 3/2022 | Anvaripour | G06F 3/0488 |
| 2022/0101606 | A1* | 3/2022 | Canberk | G06F 3/04817 |
| 2022/0101610 | A1* | 3/2022 | Anvaripour | G06F 3/0416 |
| 2022/0291789 | A1* | 9/2022 | Jones | G06Q 30/02 |

OTHER PUBLICATIONS

Bing, "Carousel Two Restaurants Near Me", https://www.bing.com/search?q=carousel+two+restaurants+near+me&form=QBLH&sp=-1&pq=carousel+two+restaurants+near+me&sc=10-32& qs=n&sk=&cvid=9BB4BBCEA4B34A53B052242D3859A3FF&ghsh=0&ghacc=0&ghpl=, retrieved on Sep. 15. 2021, 3 pages.

Nielsen Norman Group, "Carousel Usability: Designing an Effective UI for Websites with Content Overload", https://www.nngroup.com/articles/designing-effective-carousels/, retrieved on Sep. 15, 2021, 12 pages.

UI Patterns, "Carousel Design Pattern", ui-patterns.com/patterns/Carousel, retrieved on Sep. 15, 2021, 6 pages.

Yahoo Search Restaurants Near Me, retrieved on Sep. 15, 2021, https://search.yahoo.com/search?p=restaurants+near+me&fr=yfp-t-s&fr2=p%3Afp %2Cm%3Asa% 2Cct%3Asa%2Ckt%3 Anone &ei= UTF- 8&fp=1, 3 pages.

Yahoo, "Home Weather Mail Search Politics News Finance Sports Videos", www.yahoo.com, retrieved on Sep. 15, 2021, 20 pages.

* cited by examiner

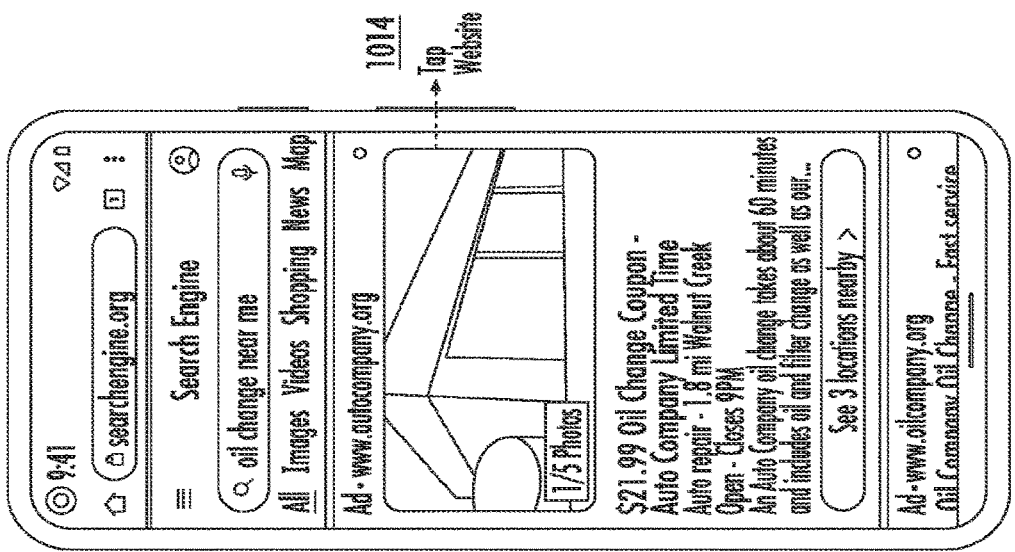
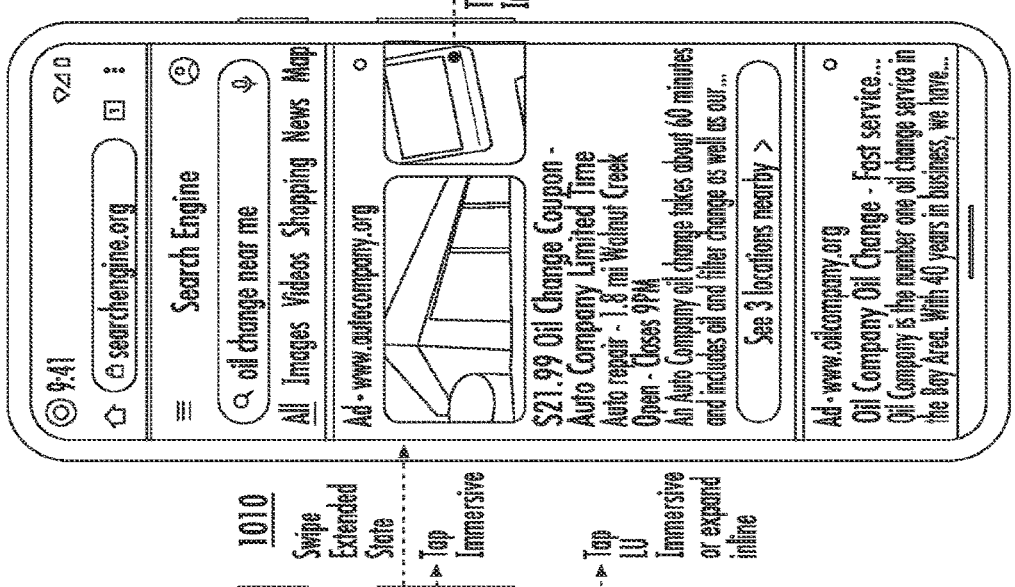
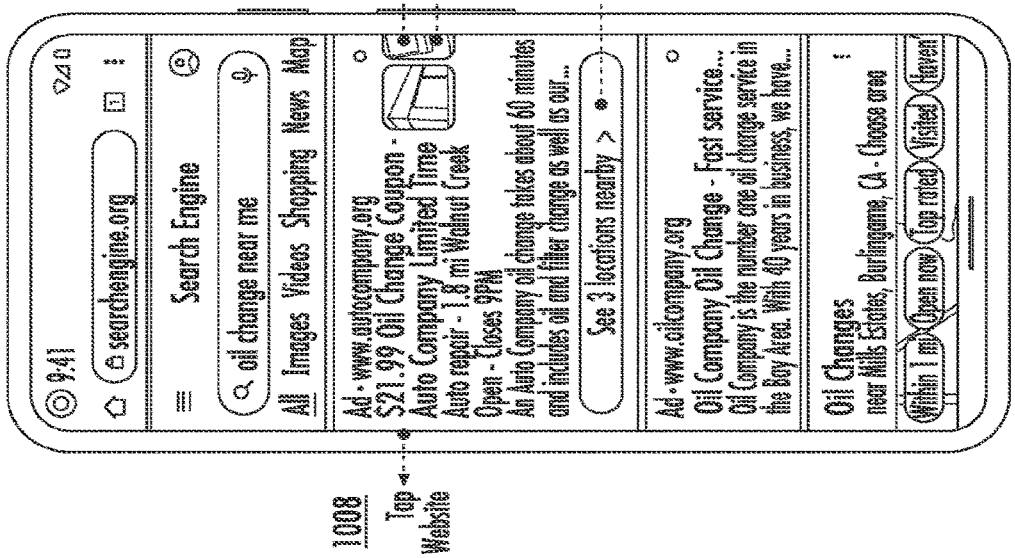
FIG. 10

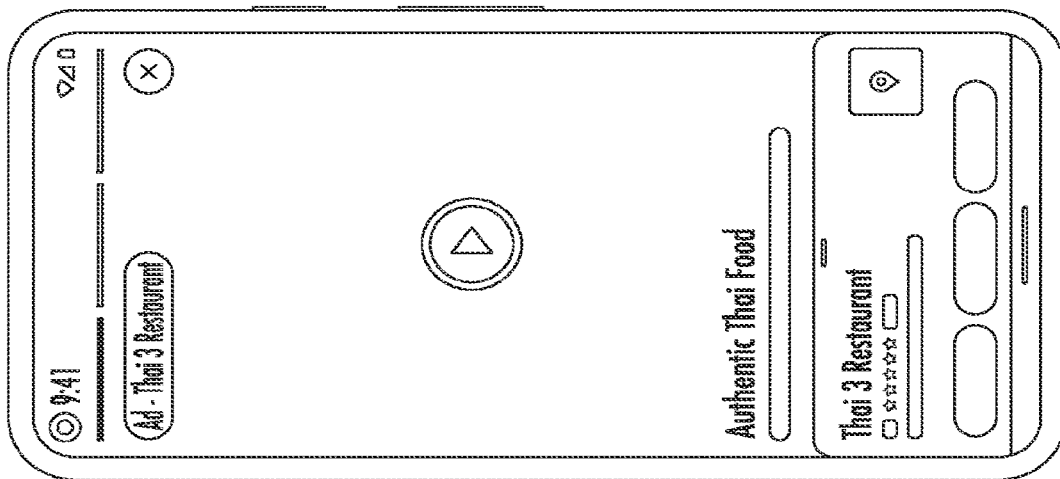
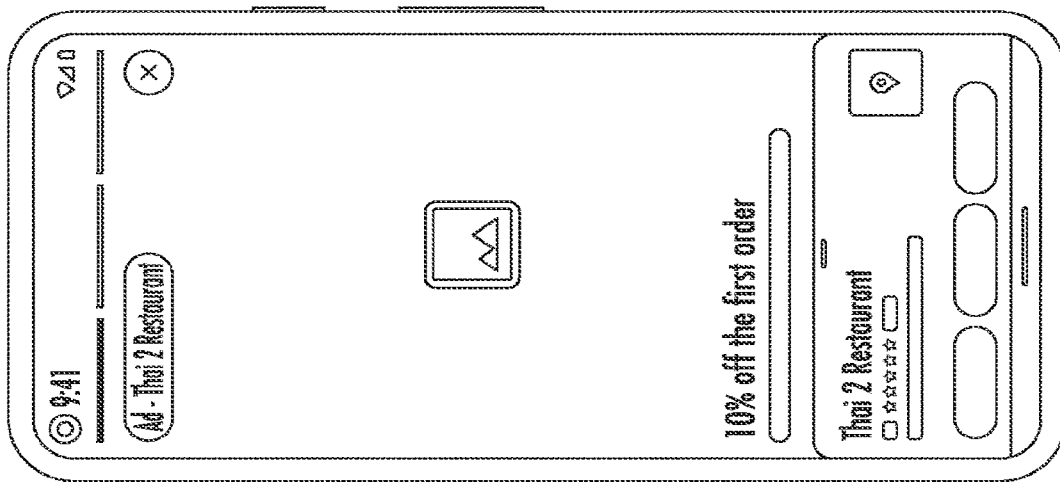
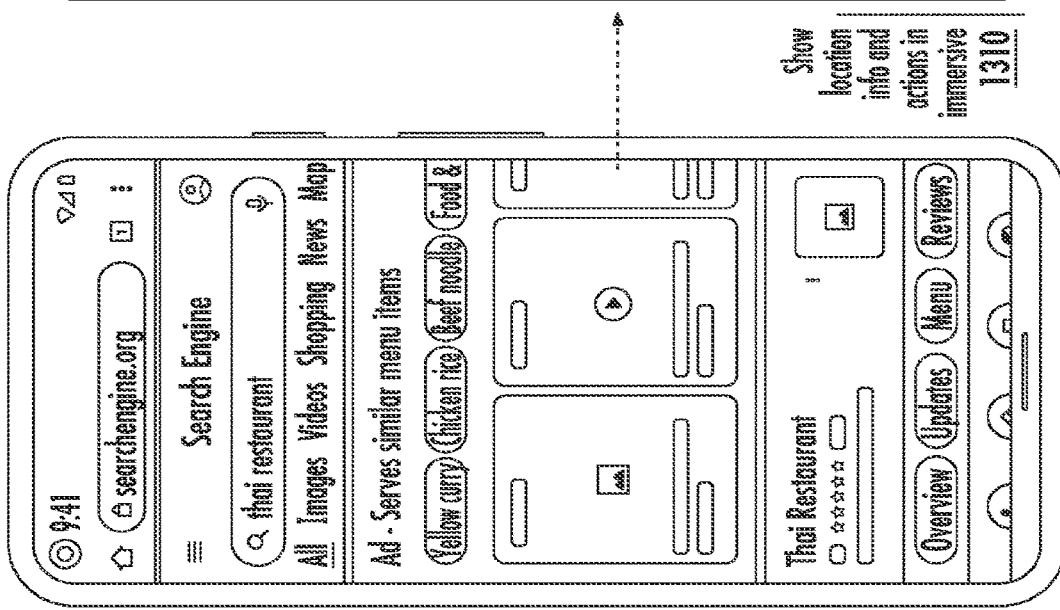
FIG. 13

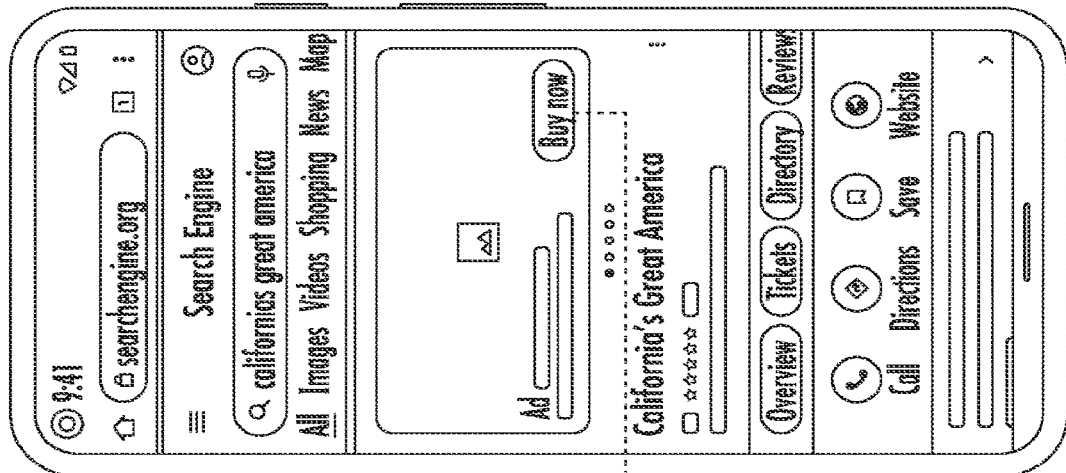
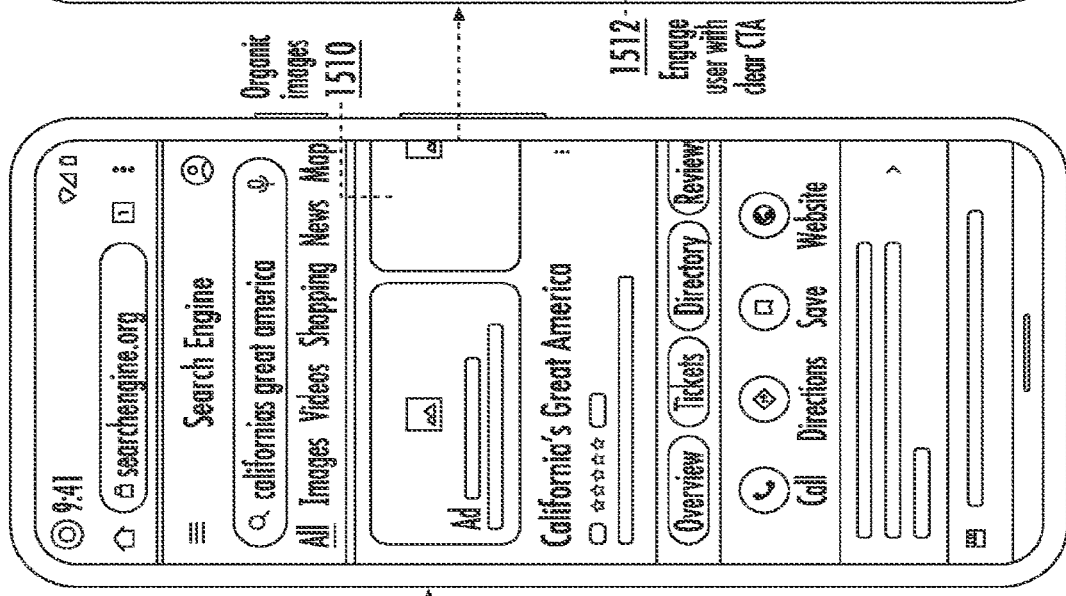
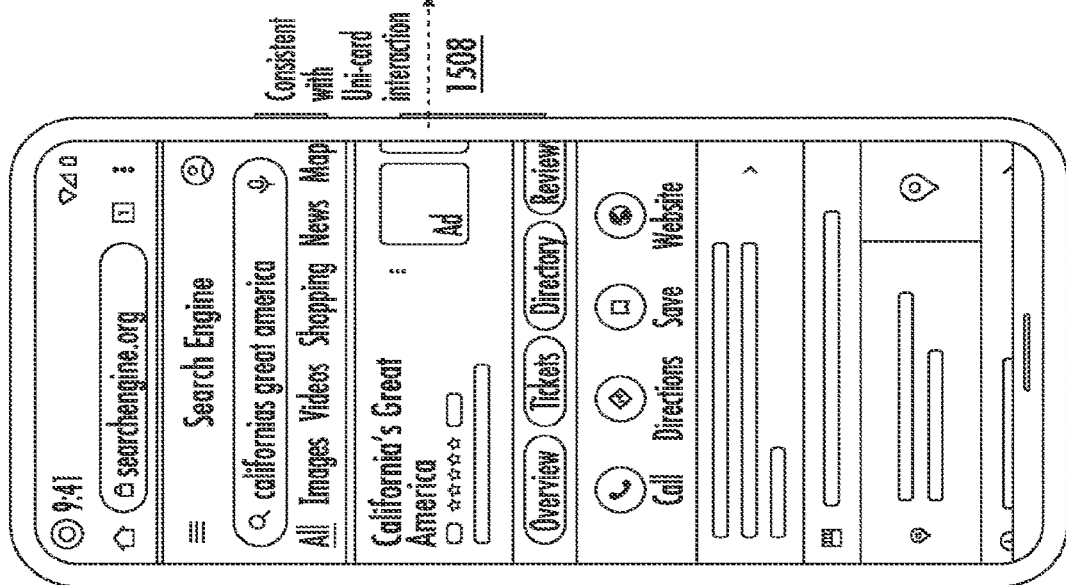
FIG. 15

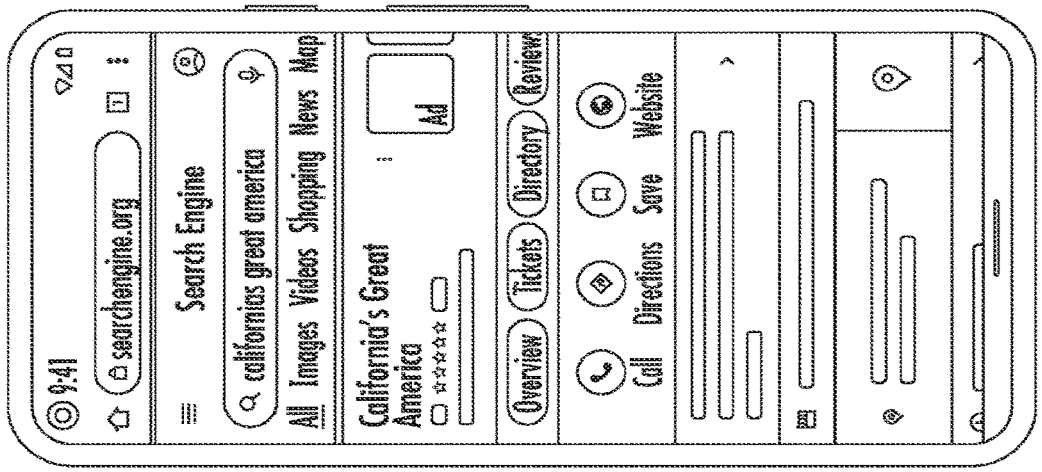
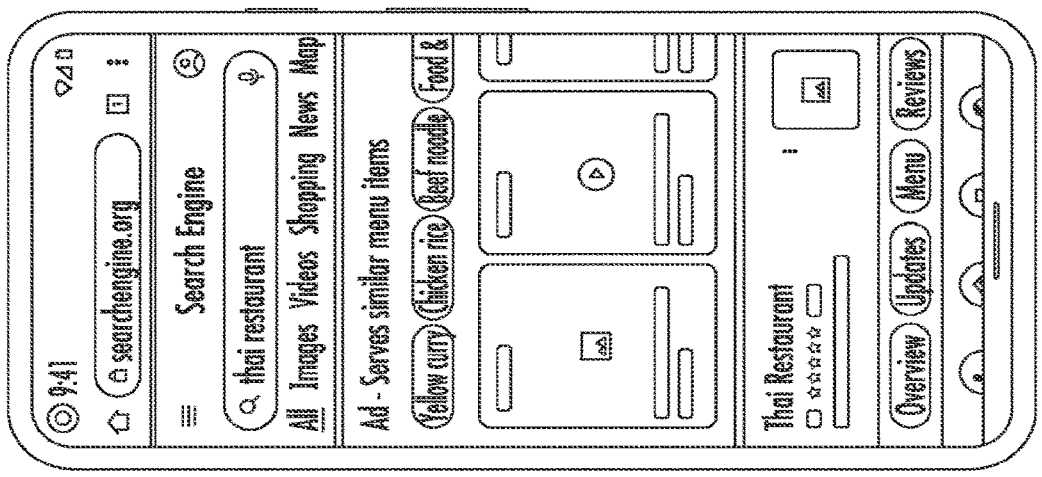
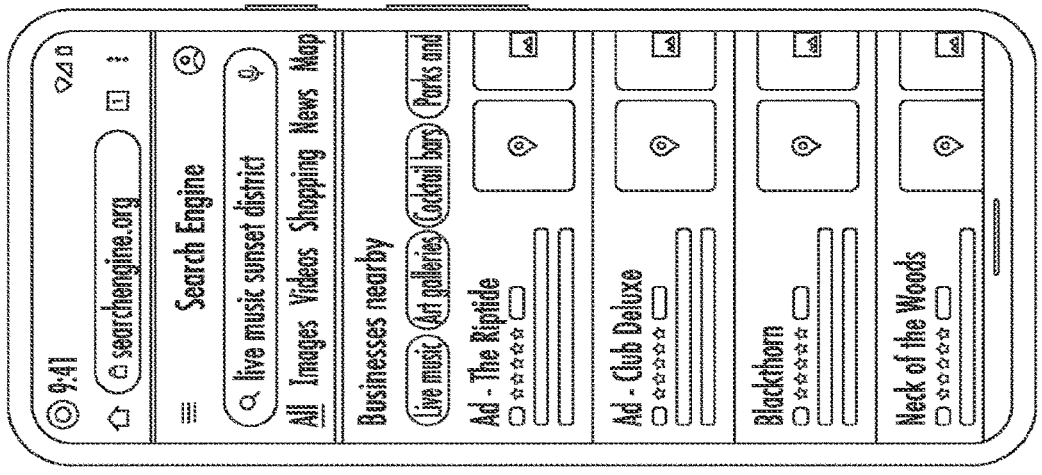
FIG. 16

Default
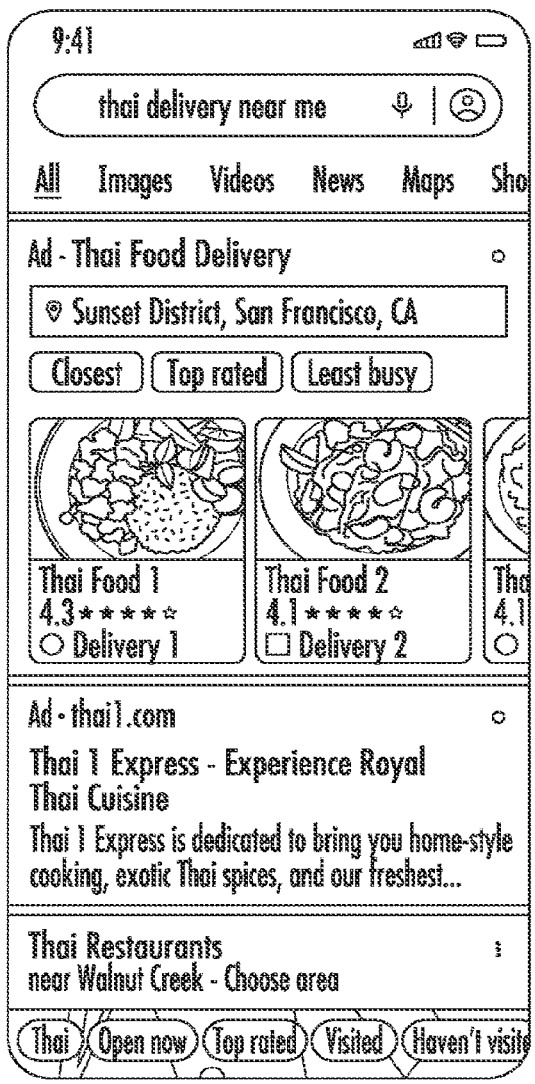
2102
Immersive
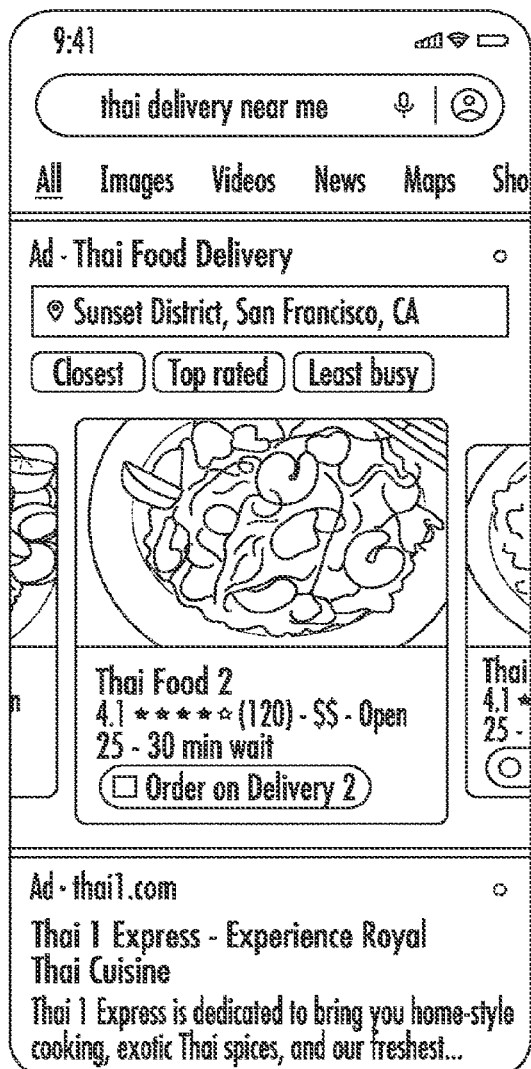
2104
FIG. 21

IMMERSIVE, MULTI-STATE UNI-CARD

PRIORITY CLAIM

This application is a continuation of International Application No. PCT/US2021/062154 filed on Dec. 7, 2021. International Application No. PCT/US2021/062154 is hereby incorporated by reference in its entirety.

FIELD

The present disclosure relates generally to providing a multi-state user interface. More particularly, the present disclosure relates to providing a dynamic multi-state interface that can be interacted with to provide more in-depth and immersive information on a topic and/or a sub-topic in response to each subsequent input.

BACKGROUND

During a search a user may be looking for specific information or may not yet know what detailed information they are looking for in particular. General search result pages in response to a query can provide one or more search results that a user can navigate to based on a link; however, the task of entering and exiting search results can be tedious, time consuming, and can be computationally expensive for rendering and retrieving.

Users may not be aware of key terms or phrases related to a sub-topic or detailed information they are looking for and may not want to navigate to different pages of search results just to find the one detail they are looking for in their search. Suggested follow-up queries can be useful but continually working through the suggested follow-up queries can also be time consuming and tedious and may lead down a wrong path, which could cause backtracking back to an original page after navigating to several different search result pages.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for content display. The method can include obtaining, by a computing system including one or more processors, a plurality of tiles and an initial interface. Each of the plurality of tiles can be associated with a respective content item of a plurality of content items, and the initial interface can be associated with the plurality of content items. In some implementations, the method can include providing, by the computing system, the initial interface to a user computing device and receiving, by the computing system, an initial selection in the initial interface. The method can include providing, by the computing system, a first tile and a second tile of the plurality of tiles. In some implementations, the first tile and the second tile can be provided in a carousel interface. The method can include receiving, by the computing system, a tile selection. The tile selection can include a user input selecting at least one of the first tile or the second tile. In some implementations, the method can include obtaining, by the computing system, supplemental content associated with a selected content item associated with at least one of the first tile or the second tile and providing, by the computing system, the supplemental content to the user computing device.

In some implementations, obtaining the plurality of tiles and the initial interface can include obtaining, by the computing system, the plurality of content items and generating, by the computing system, the plurality of tiles based at least in part on the plurality of content items. The plurality of content items can be obtained in response to a request, the request can be associated with a particular topic, and the plurality of content items can be associated with the particular topic. In some implementations, generating the plurality of tiles can include obtaining a media snippet from each of the plurality of content items. The supplemental content can include a graphical map. In some implementations, the graphical map can include one or more indicators associated with one or more of the plurality of content items.

Obtaining, by the computing system, the supplemental content associated with the selected content item associated with at least one of the first tile or the second tile can include obtaining, by the computing system, location data associated with a user and generating, by the computing system, location-specific supplemental content based on the location data and the selected content item. In some implementations, the initial interface can include an initial tile associated with at least one of the plurality of content items, and the initial selection can include a selection of the initial tile. The supplemental content can include an informational graphic pop-up.

In some implementations, the supplemental content can include a multi-media display. The initial interface can include general information on a topic, the plurality of content items can include specific information on a plurality of respective sub-topics, and the supplemental content can include detailed information on a particular sub-topic. In some implementations, the initial interface, the first tile, the second tile, and the supplemental content can be provided in a singular user interface. The singular user interface can include a search engine interface. In some implementations, the initial selection can be determined based on a gesture input, and the gesture input can include a swipe gesture.

Another example aspect of the present disclosure is directed to a computing system for information retrieval and display. The computing system can include one or more processors and one or more non-transitory computer-readable media that collectively store instructions that, when executed by the one or more processors, cause the computing system to perform operations. The operations can include obtaining a plurality of tiles and an initial interface. In some implementations, each of the plurality of tiles can be associated with a respective media content item of a plurality of content items, and the initial interface can be associated with the plurality of content items. The operations can include providing the initial interface to a user computing device. The operations can include receiving a gesture input associated with the initial interface and providing a first tile and a second tile of the plurality of tiles. In some implementations, the first tile and the second tile can be provided in a carousel interface. The operations can include receiving a tile selection. The tile selection can include a user input selecting a particular tile of the plurality of tiles. In some implementations, the operations can include obtaining supplemental content associated with a selected content item associated with the particular tile and providing the supplemental content to the user computing device.

In some implementations, at least one of the first tile or the second tile can include a map tile, and the map tile can be descriptive of a location associated with a location content item. The first tile can be descriptive of a map, and the second tile can be descriptive of an image.

Another example aspect of the present disclosure is directed to one or more non-transitory computer-readable media that collectively store instructions that, when executed by one or more computing devices, cause the one or more computing devices to perform operations. The operations can include obtaining a plurality of tiles. Each of the plurality of tiles can be associated with a respective content item of a plurality of content items. In some implementations, the operations can include providing an initial tile of the plurality of tiles for display. The operations can include receiving a first user input selecting the initial tile. In response to receiving the first user input selecting the initial tile, the operations can include providing a first tile and a second tile of the plurality of tiles. The initial tile, the first tile, and the second tile can be provided in a carousel interface. The operations can include receiving a second user input selecting a particular tile. In some implementations, the particular tile can include at least one of the initial tile, the first tile, or the second tile. The operations can include obtaining supplemental content associated with a selected content item associated with the particular tile and providing the supplemental content for display.

In some implementations, the first user input can be descriptive of a swipe gesture to a touch screen display. The operations can include receiving a third user input associated with the carousel interface and adjusting a display size for at least one of the initial tile, the first tile, or the second tile. The carousel interface can include a first carousel and a second carousel, the first carousel can include a plurality of graphical tiles, and the second carousel can include a plurality of textual tiles. In some implementations, the initial tile, the first tile, the second tile, and the supplemental content can be provided in a self-contained gadget of a search results interface, and the search results interface can include a plurality of search results during the display of the initial tile, the first tile, the second tile, and the supplemental content. The operations can include adjusting a display size of the initial tile in response to the first user input, and the supplemental content can include map data displayed in a larger display size than the initial tile, the first tile, and the second tile. In some implementations, the map data can include route data and traffic data overlaid over a map.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 10 depicts an illustration of example interface interactions according to example embodiments of the present disclosure.

FIG. 13 depicts an illustration of an example stories interface according to example embodiments of the present disclosure.

FIG. 15 depicts an illustration of an example uni-card interface layout according to example embodiments of the present disclosure.

FIG. 16 depicts an illustration of an example parallel uni-card interface according to example embodiments of the present disclosure.

FIG. 21 depicts an illustration of an example size adjustment transition according to example embodiments of the present disclosure.

Figure 1:
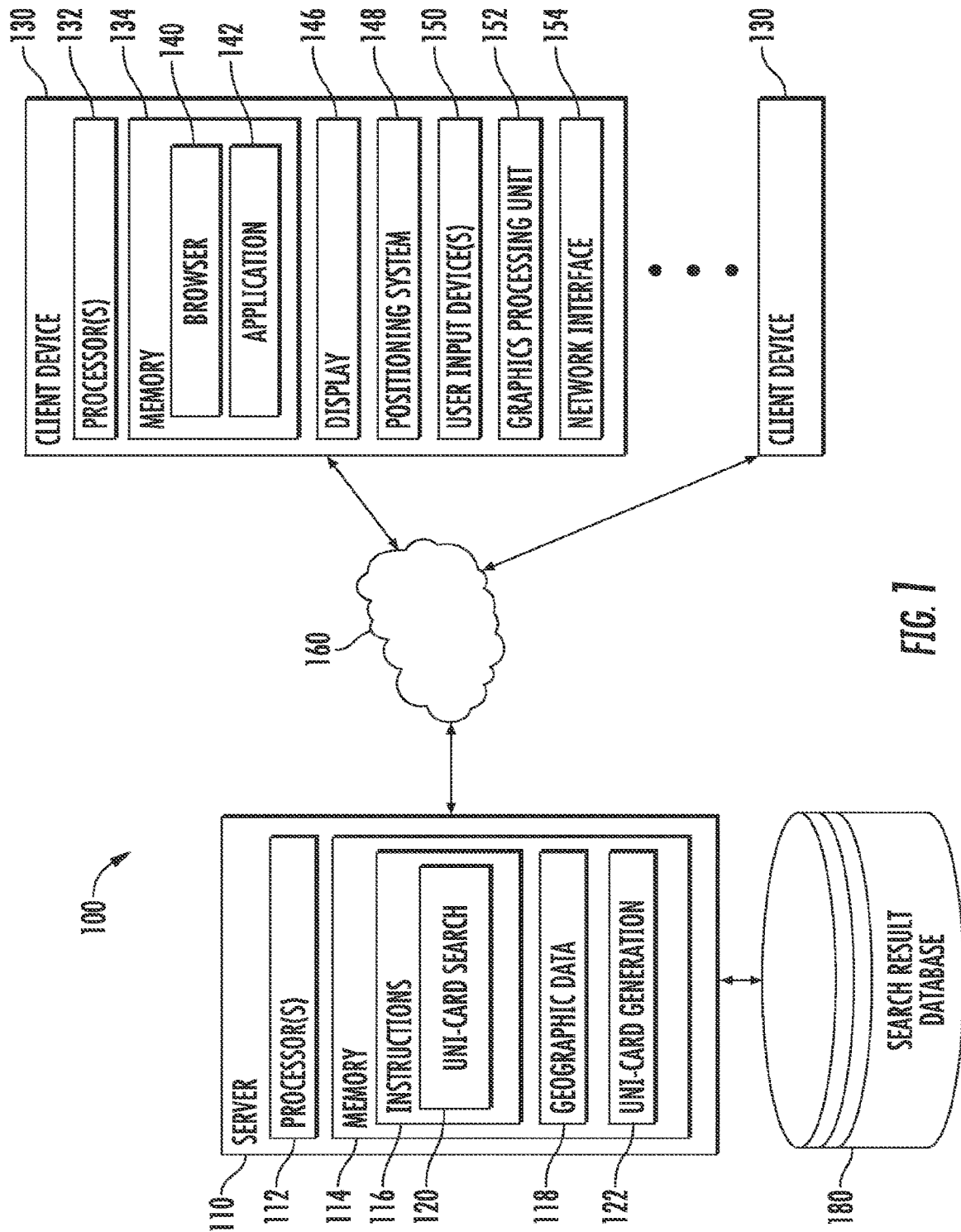
FIG. 1 depicts a block diagram of an example computing system that performs uni-card interface generation and display according to example embodiments of the present disclosure.

Reference numerals that are repeated across plural figures are intended to identify the same features in various implementations.

DETAILED DESCRIPTION

Overview

Generally, the present disclosure is directed to systems and methods for providing a multi-state uni-card user interface. More specifically, the systems and methods disclosed herein can include obtaining a plurality of tiles and an initial interface. Each of the plurality of tiles can be associated with a respective content item of a plurality of content items. In some implementations, the initial interface can be provided to a user computing device, and the initial interface may include an initial tile from the plurality of tiles. An initial selection may then be received. In some implementations, the initial selection can be determined based on a first input associated with a portion of the initial interface (e.g., a swipe gesture over the initial tile). In response to the initial selection, the systems and methods can provide a first tile and a second tile of the plurality of tiles. In some implementations, the first tile and the second tile can be provided in a carousel interface. Additionally and/or alternatively, the carousel interface can include the initial tile. A tile selection can then be received (e.g., a second input including a tap gesture over a specific tile may be received). Supplemental content (e.g., supplemental information descriptive of a route for driving to a particular location overlayed over a map) can then be obtained associated with a particular selected content item associated with the selected tile (e.g., the first tile, the second tile, or the initial tile). The systems and methods can include providing the supplemental content to the user computing device.

In some implementations, the initial interface, the first tile, the second tile, and the supplemental information may be provided as part of a singular user interface (e.g., the user interface of a results page of a search engine). Additionally and/or alternatively, the initial interface may include general information on a particular topic, the plurality of content items can be descriptive of different sub-topics of the general topic, and the supplemental content, or supplemental information, may include detailed information about a selected sub-topic. In some implementations, the supplemental information can include map data generated based on the selected content item and a determined location of the user. For example, the first tile may depict a map, and the second tile may depict an image. In response to a selection of the first tile, a larger, more detailed map may be provided as supplemental information in the user interface. Additionally and/or alternatively, in response to a selection of the second tile, a larger, more detailed image may be provided as supplemental information in the user interface. Alternatively, the supplemental information may include information different from the information displayed in the selected tile (e.g., the tile may depict an image of a food item, while the supplemental information may include text data descriptive of a menu).

In some implementations, the systems and methods disclosed herein can be utilized for providing a user with a compact and intuitive user interface for quickly navigating to and accessing information related to a particular topic. The systems and methods can receive a query on a topic, provide an option to view sub-topics via tiles, and then provide supplemental information on the tiles while continuing to provide the search results page originally provided to the user in response to the query.

The systems and methods disclosed herein can be utilized to provide a dynamic uni-card interface that can be leveraged to provide more detailed information on a topic inside a singular search result interface. For example, the systems and methods can include obtaining a plurality of tiles. Each of the plurality of tiles can be associated with a respective content item of a plurality of content items. In some implementations, the systems and methods can obtain a plurality of tiles and an initial interface. Each of the plurality of tiles can be associated with a respective media content item of a plurality of content items, and the initial interface can be associated with the plurality of content items.

In some implementations, obtaining the plurality of tiles and the initial interface can include obtaining the plurality of content items, and generating the plurality of tiles based at least in part on the plurality of content items. Additionally and/or alternatively, the plurality of content items can be obtained in response to a request. The request can be associated with a particular topic, and the plurality of content items can be associated with the particular topic. In some implementations, generating the plurality of tiles can include obtaining a media snippet from each of the plurality of content items.

The tiles can be generated manually by a content provider and/or by a search engine provider. Alternatively and/or additionally, the tiles can be generated automatically based on the data obtained related to or associated with the obtained content items. For example, the tiles can include images extracted from a webpage, in which the webpage includes an article content item with images. In some implementations, the content item can be associated with or describe a location, and the systems and methods can automatically determine the location. The location can then be indicated with a pin, and the tile can be generated with a map of an area associated with the location with the location indicated with a pin icon. Alternatively and/or additionally, the systems and methods can have default tile icons for specific content item types.

Additionally and/or alternatively, the initial interface can include an initial tile associated with at least one of the plurality of content items. The plurality of content items can include one or more types of content items. For example the content items can include videos, images, maps, text, multimodal items, interactive items, articles, webpages, locally stored content items, and/or server stored content items The systems and methods can provide an initial tile of the plurality of tiles for display. In some implementations, the initial tile can be part of an initial interface. Alternatively and/or additionally, the systems and methods can include providing the initial interface to a user computing device.

The systems and methods can include receiving a first user input. The first user input can include an initial selection in the initial interface. In some implementations, the first user input can include a selection of the initial tile. Alternatively and/or additionally, the first user input can include a gesture input associated with the initial interface (e.g., a swipe located near an initial tile in the initial interface). The initial selection can be a selection of the initial tile.

In some implementations, the initial selection can be determined based on a gesture input, in which the gesture input can include a swipe gesture. The swipe gesture may be input with a touch screen display.

In response to receiving the first user input selecting the initial tile, the systems and methods can provide a first tile and a second tile of the plurality of tiles. In some implementations, the initial tile, the first tile, and the second tile can be provided in a carousel interface. Alternatively and/or additionally, the interface may transition from the initial interface to a carousel interface including a first tile and a second tile of the plurality of tiles.

In some implementations, the first tile and/or the second tile can include a map tile. The map tile can be descriptive of a location associated with a location content item. In some implementations, the first tile can be descriptive of a map, and the second tile may be descriptive of an image, or vice versa.

Additionally and/or alternatively, the carousel interface can include a first carousel and a second carousel, in which the first carousel can include a plurality of graphical tiles, and the second carousel can include a plurality of textual tiles.

In some implementations, in response to receiving the first user input, the systems and methods can include adjusting a display size of the initial tile in response to the first user input.

Alternatively and/or additionally, a user input (e.g., a third user input) can be received, and in response to the third user input, the systems and methods can involve adjusting a display size for one or more of the initial tile, the first tile, or the second tile. For example, as a user navigates through the carousel, the tile closest to a certain position (e.g., the center of the interface, the location of the last input contact, the left part of the interface, the right part of the interface, and/or the focal point of the interface) may be displayed as larger than the other tiles of the plurality of tiles. The tiles can grow in size and shrink in size as the carousel interface is navigated through.

The systems and methods can include receiving a second user input. In some implementations, the second user input can include a tile selection. The tile selection can include a user input selecting a particular tile (e.g., one or more of the initial tile, the first tile, or the second tile) of the plurality of tiles.

The systems and methods can obtain supplemental content associated with a selected content item associated with the second user input. For example, the supplemental content can be associated with the particular tile selected with the second user input (e.g., the initial tile, the first tile, and/or the second tile). Additionally and/or alternatively, the supplemental content can be associated with a selected content item associated with the particular tile.

In some implementations, the initial interface can include general information on a topic. The plurality of content items can include specific information on a plurality of respective sub-topics, and the supplemental content can include detailed information on a particular sub-topic.

Obtaining the supplemental content associated with the selected content item associated with the particular tile can include obtaining location data associated with a user and generating location-specific supplemental content based on the location data and the selected content item.

In some implementations, the supplemental content can include a multi-media display. Alternatively and/or additionally, the supplemental content can include an informational graphic pop-up. The supplemental content can include a graphical map. In some implementations, the graphical map can include one or more indicators associated with one or more of the plurality of content items.

The systems and methods can include providing the supplemental content for display. In some implementations, the supplemental content can be provided to the user computing device. The supplemental content can include map data displayed in a larger display size than the initial tile, the first tile, and the second tile. The map data can include route data and traffic data overlaid over a map.

The initial tile, the first tile, the second tile, and the supplemental content can be provided in a self-contained gadget of a search results interface. The search results interface can include a plurality of search results during the display of the initial interface, the first tile, the second tile, and the supplemental content. Additionally and/or alternatively, the initial interface, the first tile, the second tile, and the supplemental content can be provided in a singular user interface. The singular user interface can include a search engine interface.

In some implementations, the uni-card interface can be provided alongside a plurality of search results in response to a search query. Alternatively and/or additionally, the uni-card interface can be provided as, or part of, a knowledge panel displayed in an adjacent location to the plurality of search results.

The uni-card interface may be provided as a gadget or widget displayed within a webpage. The gadget may be provided as a constant size. Alternatively and/or additionally, the gadget may change sizes as the user interacts with the uni-card interface.

The uni-card interface can be provided as a web gadget, a widget, or via a variety of other interface features. Moreover, the uni-card interface can be provided on a search results page, in an article, in a social media interface, in a web application, locally in a localized application, in a mobile user interface (e.g., an operating system of a mobile device), or a variety of other manners.

In some implementations, the uni-card interface can include a three state display (e.g., a condensed state, an expanded state, and an immersive state). The uni-card interface can include a dynamic interface such that the interface can provide increasing information in response to each user interaction. For example, the uni-card interface can have an initial condensed state that can be interacted with in order to trigger the display of an expanded state with more detailed information and/or a larger display of information. The expanded state can then be interacted with in order to trigger the display of the immersive state that can provide detailed and immersive information on a topic (e.g., routing information to get to a store location, a detailed menu, a video display, an article preview window, etc.).

The uni-card interface can occur as a singular instance in a webpage. Alternatively and/or additionally, the uni-card interface can occur in parallel such that multiple instances of a uni-card interface can be displayed in a single webpage or application at the same time. The parallel instances of the uni-card interface can be provided together or dispersed throughout a webpage. The interactions with one uni-card interface may cause other uni-card interfaces in the webpage or user interface to default back to an initial state. Alternatively and/or additionally, the uni-card interfaces may act independently from one another such that a user can interact with one uni-card interface, move onto interact with a second uni-card interface, and then return to the first uni-card interface in the same state with the same display as when the user left the first uni-card interface.

In some implementations, the tiles can be elements that grow upon each interaction, such that the initial state can include small elements, the second state can include medium sized elements, and the third state can include large elements.

The uni-card interface can be provided as part of an advertisement campaign in which a third party can contract with an advertisement provider to have the uni-card interface provided to a client computing system. In some implementations, the advertisement provider may provide a uni-card development interface to the third party. The third party can then build a customized uni-card interface by interacting with the uni-card development interface. Alternatively and/or additionally, the uni-card interface may be generated automatically or manually by the advertisement provider computing system.

Building the uni-card can involve interaction with one or more templates, which can include one or more fixed components and/or one or more optional components. The different templates can include different densities and or different quantities of elements. The templates can be further customized with customization of the building blocks in each respective template. In some implementations, the uni-card can be adjusted based on a determined user input and/or by a determined user intent.

The uni-card interface may be self-contained or may affect surrounding interface elements.

In some implementations, the content of the second state and the third state may be determined based at least in part on the type of gesture. For example, a tap gesture may cause a different tile action in comparison with a swipe gesture or a double tap gesture.

The systems and methods can include a fourth user input. The fourth user input can be a selection of an interface element that is configured to redirect the user computing system to a webpage for accessing the content item outside of the uni-card interface.

The uni-card interface may be generated and/or obtained in response to a search query. The search query may be determined as being associated with a category, and the content items may be associated with different content items associated with the particular category.

The systems and methods of the present disclosure provide a number of technical effects and benefits. As one example, the system and methods can provide a dynamic multi-state interface. More specifically, the systems and methods can provide an interface that provides more detailed information upon each interaction without navigating away from an original webpage. For example, in some implementations, the systems and methods can include a first state with an initial tile that can then transition to an expanded second state with multiple tiles after a first user input. A second user input can trigger a transition from the expanded second state to the third state that can include immersive information on a topic.

Another technical benefit of the systems and methods of the present disclosure is the ability to navigate from a general topic to a more specific sub-topic without navigating to a new webpage. For example, the systems and methods can begin with an initial interface response to a search query that displays information on a general topic. An interaction with the initial interface can cause a carousel interface to be displayed with a plurality of sub-topics. A user can then interact with one of the tiles of the carousel interface, which can cause detailed information on the sub-topic to be displayed.

Another example technical effect and benefit relates to improved computational efficiency and improvements in the functioning of a computing system. For example, the systems and methods disclosed herein can leverage a multi-state user interface to provide progressively more detailed information without navigating to different webpages on each interaction. The singular interface on a singular webpage can cause a single webpage to provide an immersive and expansive search experience without navigating through search result web pages. Moreover, the systems and methods disclosed herein may reduce the computational overhead involved in navigating to the different web pages during the research of a topic. Additionally and/or alternatively, the systems and methods disclosed herein can reduce the network bandwidth used in searching by reducing the different web pages being loaded and by providing the search results web page with supplemental content instead of directly redirecting to a web resource that would need to be rendered in its entirety.

With reference now to the Figures, example embodiments of the present disclosure will be discussed in further detail.

Example Devices and Systems

FIG. 1 depicts an exemplary computing system 100 that can be used to implement a uni-card interface according to aspects of the present disclosure. The system 100 has a client-server architecture that includes a server 110 that communicates with one or more client devices 130 over a network 160. However, the present disclosure can be implemented using other suitable architectures, such as a single computing device unconnected to a network.

The system 100 includes a server 110, such as, for example, a web server. The server 110 can be one or more computing devices that are implemented as a parallel or distributed computing system. In particular, multiple computing devices can act together as a single server 110. The server 110 can have one or more processor(s) 112 and a memory 114. The server 110 can also include a network interface used to communicate with one or more remote computing devices (e.g., client devices) 130 over a network 160.

The processor(s) 112 can be any suitable processing device, such as a microprocessor, microcontroller, integrated circuit, or other suitable processing device. The memory 114 can include any suitable computing system or media, including, but not limited to, computer-readable media that may be non-transitory, RAM, ROM, hard drives, flash drives, or other memory devices. The memory 114 can store information accessible by processor(s) 112, including instructions 116 that can be executed by processor(s) 112. The instructions 116 can be any set of instructions that when executed by the processor(s) 112, cause the processor(s) 112 to provide desired functionality.

In particular, the instructions 116 can be executed by the processor(s) 112 to implement a uni-card search 120. The uni-card search 120 can be configured to provide a uni-card interface as a search result in response to a search query. In some implementations, the uni-card search 120 can be configured to access a search result database 180 to retrieve data associated with a determined intent of a search query, and the uni-card interface can be generated using the uni-card generation element 122 stored in the memory 114 of the server computing system 110.

It will be appreciated that the term "element" can refer to computer logic utilized to provide desired functionality. Thus, any element, function, and/or instructions can be implemented in hardware, application specific circuits, firmware and/or software controlling a general purpose processor. In one implementation, the elements or functions are program code files stored on the storage device, loaded into memory and executed by a processor or can be provided from computer program products, for example computer executable instructions, that are stored in a tangible computer-readable storage medium such as RAM, hard disk or optical or magnetic media.

Memory 114 can also include geographic data 118 that can be retrieved, manipulated, created, or stored by processor(s) 112. Geographic data 118 can include geographic imagery (e.g., digital maps, satellite images, aerial photographs, street-level photographs, synthetic models, etc.), tables, vector data (e.g., vector representations of roads, parcels, buildings, etc.), point of interest data (e.g., locales such as islands, cities, restaurants, hospitals, parks, hotels, and schools), or other suitable geospatial data or related information. As an example, geographic data 118 can be used to access information and data associated with a location and generate one or more location related elements for the uni-card interface (e.g., a map tile and supplemental content that can include map data and routing data).

The geographic data 118 can be stored in one or more databases. The one or more databases can be connected to the server 110 by a high bandwidth LAN or WAN, or can also be connected to server 110 through network 160. The one or more databases can be split up so that they are located in multiple locales.

The server 110 can exchange data with one or more client devices 130 over the network 160. Although two clients 130 are illustrated in FIG. 1, any number of client devices 130 can be connected to the server 110 over the network 160. The client devices 130 can be any suitable type of computing device, such as a general purpose computer, special purpose computer, navigational device, laptop, desktop, integrated circuit, mobile device, smartphone, tablet, wearable-computing devices, a display with one or more processors coupled thereto and/or embedded therein, or other suitable computing device. Further, client device 130 can be multiple computing devices acting together to perform operations or computing actions.

Similar to server 110, a client device 130 can include a processor(s) 132 and a memory 134. The memory 134 can store information accessible by processor(s) 132, including instructions that can be executed by processor(s) and data. As an example, memory 134 can store a browser element 140 and an application element 142.

Browser element 140 can provide instructions for implementing a browser. In particular, the user of client device 130 can exchange data with server 110 by using the browser to visit a website accessible at a particular web-address. The uni-card search of the present disclosure can be provided as an element of a user interface of the website.

Application element 142 can provide instructions for running a specialized application on client device 130. In particular, the specialized application can be used to exchange data with server 110 over the network 160. Application element 142 can include client-device-readable code for providing and implementing aspects of the present disclosure. For example, application element 142 can provide instructions for implementing a mapping application or a virtual globe application.

The client device 130 can include various user input devices 150 for receiving information from a user, such as a touch screen, touch pad, data entry keys, speakers, mouse, motion sensor, and/or a microphone suitable for voice recognition. Further, the client device 130 can have a display 146 for presenting information, such as the information provided as part of a uni-card interface.

The client device 130 can also include a positioning system 148 that can be used to identify the position of the client device 130. The positioning system 148 can be optionally used by the user to monitor the user's position relative to the rendering. The positioning system 148 can be any device or circuitry for monitoring the position of the client device 130. For example, the positioning device 148 can determine actual or relative position by using a satellite navigation positioning system (e.g., a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

The client device 130 can further include a graphics processing unit 152. Graphics processing unit 152 can be used by processor 132 to render obtained data associated with the uni-card interface. In some embodiments, client device 130 retrieves user inputs and transmits data associated with the user inputs.

The client device 130 can include a network interface 154 for communicating with server 110 over network 160. Network interface 154 can include any components or configuration suitable for communication with server 110 over network 160, including, for example, one or more ports, transmitters, wireless cards, controllers, physical layer components, or other items for communication according to any currently known or future developed communications protocol or technology.

The network 160 can be any type of communications network, such as a local area network (e.g., intranet), wide area network (e.g., Internet), or some combination thereof. The network 160 can also include a direct connection between a client device 130 and the server 110. In general, communication between the server 110 and a client device 130 can be carried via network interface using any type of wired and/or wireless connection, using a variety of communication protocols (e.g., TCP/IP, HTTP), encodings or formats (e.g., HTML, XML), and/or protection schemes (e.g., VPN, secure HTTP, SSL).

In some implementations, the systems and methods disclosed herein can leverage one or more machine-learned models for generating a customized uni-card interface. For example, one or more machine-learned models can be trained to parse web resources and extract relevant data from the parsed web resources in order to collect data to be used to generate the different elements for the uni-card interface. Additionally and/or alternatively, the systems and methods may utilize one or more machine-learned image segmentation models for generating tiles based on obtained images from a content item. The image segmentation model may be trained to recognize a foreground object in an image, segment the foreground object or a portion of the image with the foreground object, and then utilize the segmented image as part of a tile displayed in the uni-card interface. Moreover, the systems and methods may include one or more natural language processing models for generating a semantic understanding of a content item in order to generate one or more textual snippets to be provided in the uni-card interface. Additional machine-learned models may be utilized for gesture understanding, search result collection, search result ranking, and/or a variety of other tasks.

Example Interface Arrangements

Figure 2:
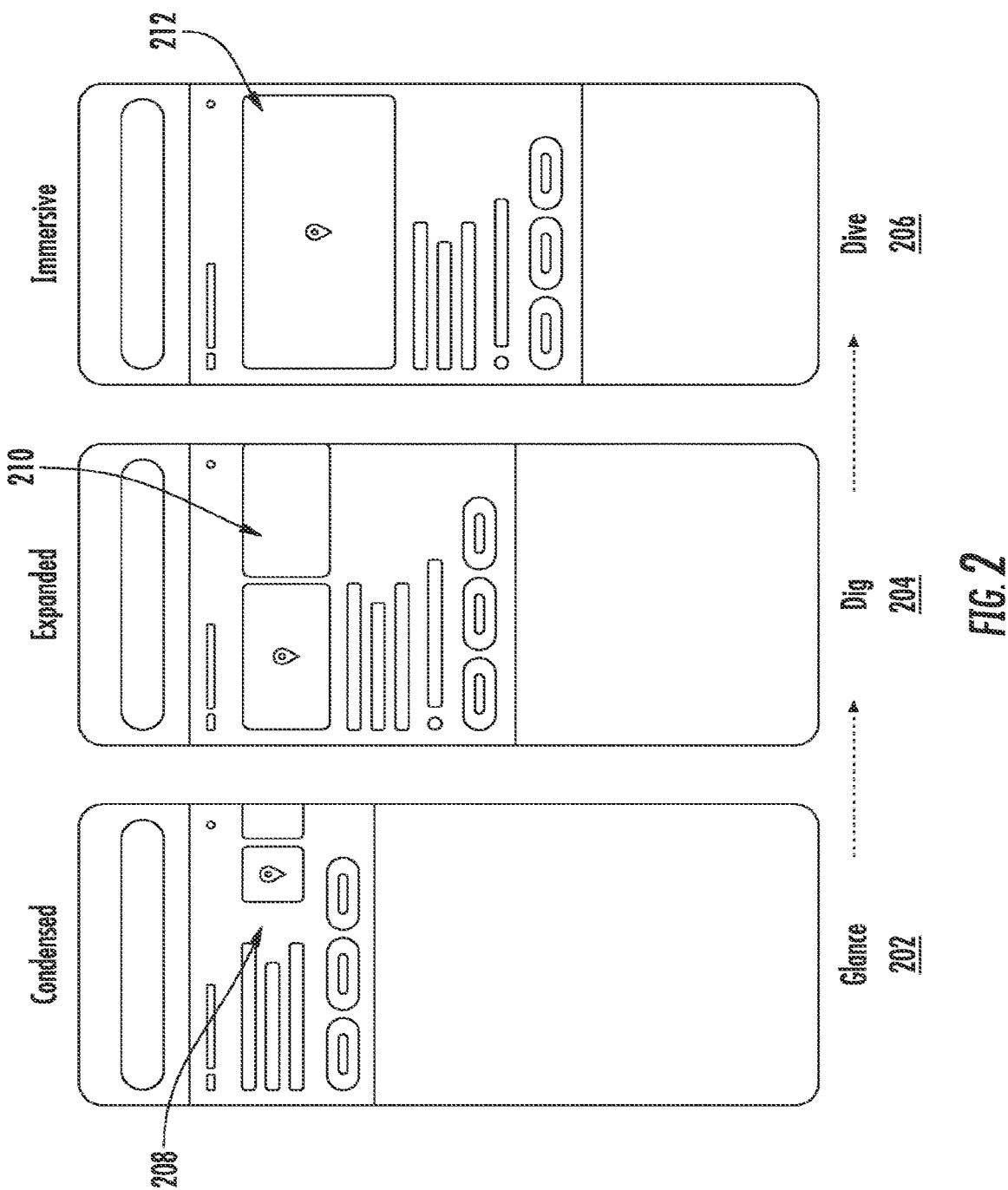
FIG. 2 depicts a block diagram of an example multi-state interface according to example embodiments of the present disclosure.

FIG. 2 depicts a block diagram of an example multi-state interface according to example embodiments of the present disclosure. In particular, FIG. 2 depicts three states of the multi-state uni-card interface including a condensed state 202, an expanded state 204, and an immersive state 206. The condensed state 202 can be an initial state or first state that can provide information at a glance. The condensed state 202 can include an initial interface, which can include an initial tile 208 of a first size. The initial interface of the condensed state 202 can include a general description, a general comment, a text carousel, and the initial tile 208.

In response to a first user input (e.g., a swipe gesture associated with the initial tile 208), the multi-state interface can transition into an expanded state 204. The expanded state 204 can be a second state and can include a first tile and a second tile 210 in a carousel interface. The carousel interface can allow for a deeper dig into information on a topic. In some implementations, the first tile and the second tile can be of a second size, in which the second size may be larger than a first size. The first tile may be an enlarged version of the initial tile. Additionally and/or alternatively, the first tile may provide an enlarged and more detailed tile related to the same content item as the initial tile. In some implementations, the expanded state 204 can be of greater size and detail than the condensed state 202.

In response to a second user input (e.g., a tap input selecting the first tile 210), the multi-state interface can transition into an immersive state 206. The immersive state 206 can be a third state that can provide more detailed and immersive detail on a specific content item related to the topic. In some implementations, the immersive state 206 can be of greater size than the expanded state 204 and the condensed state 202. The immersive state 206 can include a dive into the specific content item associated with the selected particular tile (e.g., the first tile). In some implementations, the immersive state 206 can include supplemental content 212 associated with the selected content item. For example, the supplemental content 212 can include a large map element with a pin indicating the location of interest and may include traffic and/or routing data associated with the particular location.

Figure 3:
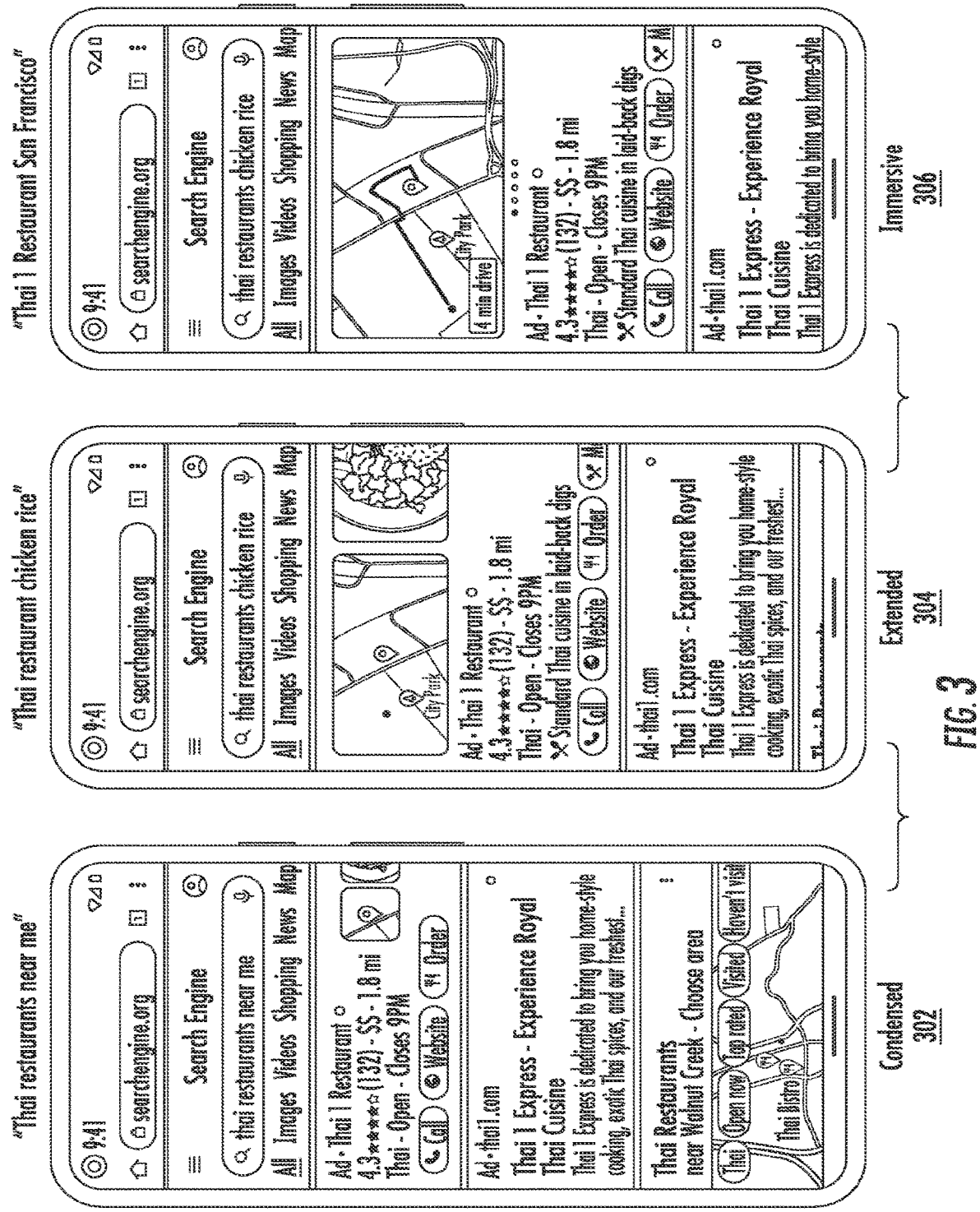
FIG. 3 depicts an illustration of an example multi-state interface with a map element according to example embodiments of the present disclosure.

FIG. 3 depicts an illustration of an example multi-state interface with a map element according to example embodiments of the present disclosure. In particular, FIG. 3 depicts an example uni-card interface displayed in a search results page. The multi-state interface can include an initial state (e.g., a condensed state 302), a second state (e.g., an expanded state 304 which can include a carousel interface 312), and a third state (e.g., an immersive state 306 which can include supplemental content 314).

The uni-card interface can be generated in response to a search query 310. In some implementations, the initial state can be provided alongside search results and may be specific to a specific search result (e.g., a specific Thai restaurant 308 determined in response to a search query 310 associated with "Thai restaurants near me").

An initial selection can then be received associated with the initial interface 308. The uni-card interface can then transition to the second state. The second state can include a carousel interface 312. The carousel interface 312 can include a first tile descriptive of map data for the specific search result (e.g., a map depicting the location of the specific Thai restaurant) and a second tile depicting an image associated with the specific search result (e.g., an image of a food item for a specific Thai restaurant).

A tile selection can then be received in which the tile selection selects a particular tile (e.g., the first tile descriptive of map data). Supplemental content 314 can be obtained and/or generated associated with the content item of the particular tile. The supplemental content 314 can be provided in the third state of the uni-card interface. The supplemental content 314 can include a map with a location pin, traffic data, and routing data. The third state may be configured to receive inputs to scroll through the supplemental content 314 for the other tiles of the plurality of tiles.

In some implementations, action textual links can be provided in all three states. The action textual links can include contact links (e.g., a call link), a website link, and/or an order link (e.g., to navigate to a food delivery third party provider's website or extension).

Figure 4:
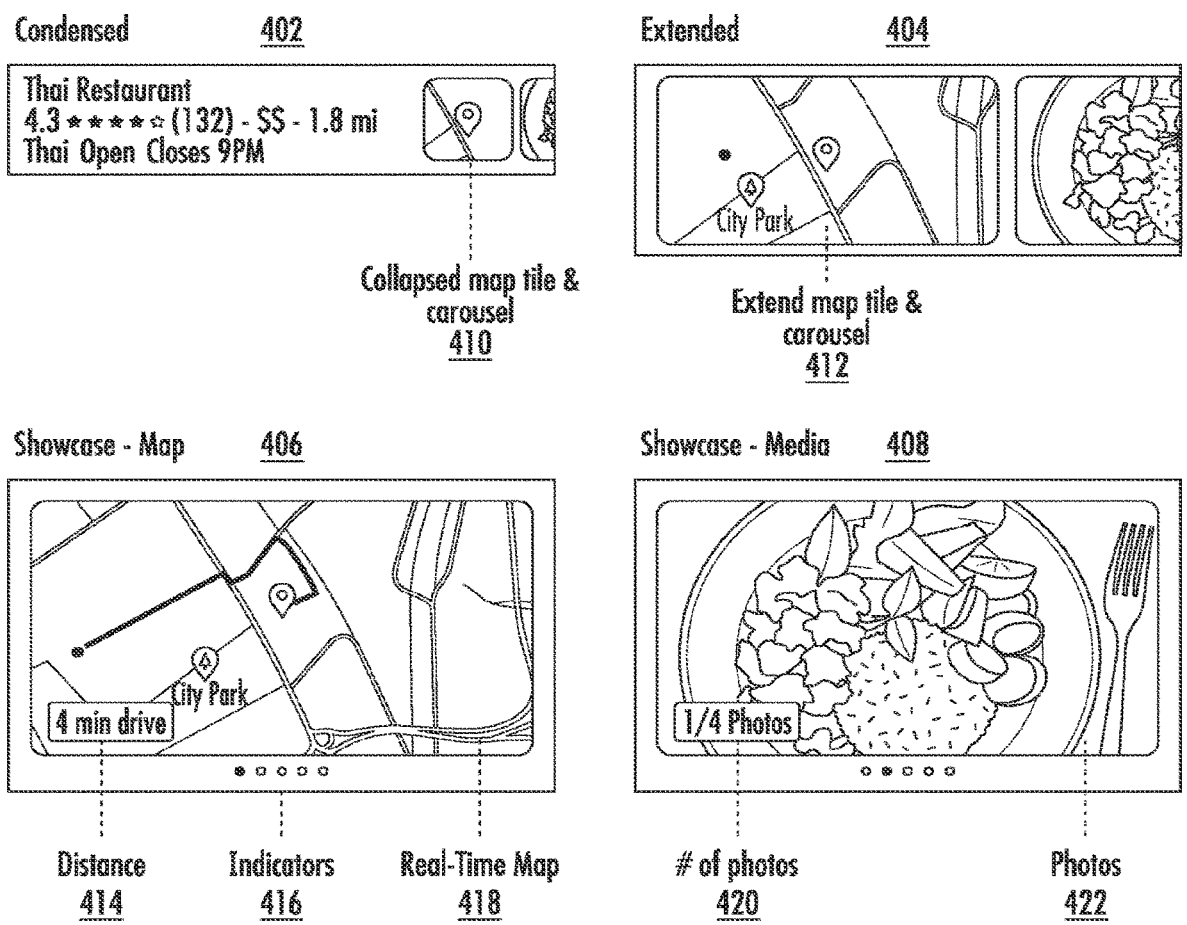
FIG. 4 depicts an illustration of an example information tiles according to example embodiments of the present disclosure.

FIG. 4 depicts an illustration of an example information tiles according to example embodiments of the present disclosure. In particular, FIG. 4 depicts an initial condensed state 402, a second expanded, or extended, state 404, and a third immersive, or showcase, state 406 & 408. In some implementations, the initial state 402 can include a collapsed map tile and carousel 410. The initial state 402 can then transition to the second state 404. The second state 404 can include an extended map tile and carousel 412 of an increased size in comparison to the collapsed map tile and carousel 410.

The second state 404 can then transition to the third state 406 & 408. The third state 406 & 408 can include a plurality of supplemental content tiles. For example, the showcase can include a map showcase 406 and a media showcase 408. The map showcase 406 can include a real-time map, distance data 414, and an indicator 416 to indicate which showcase tile is currently being displayed (e.g., a first supplemental content tile, a second supplemental content tile, etc.). The media showcase 408 can include one or more photos 422 and a number of photos key 420 that can be descriptive of which photo is being viewed and the total number of photos in the album.

Figure 5:
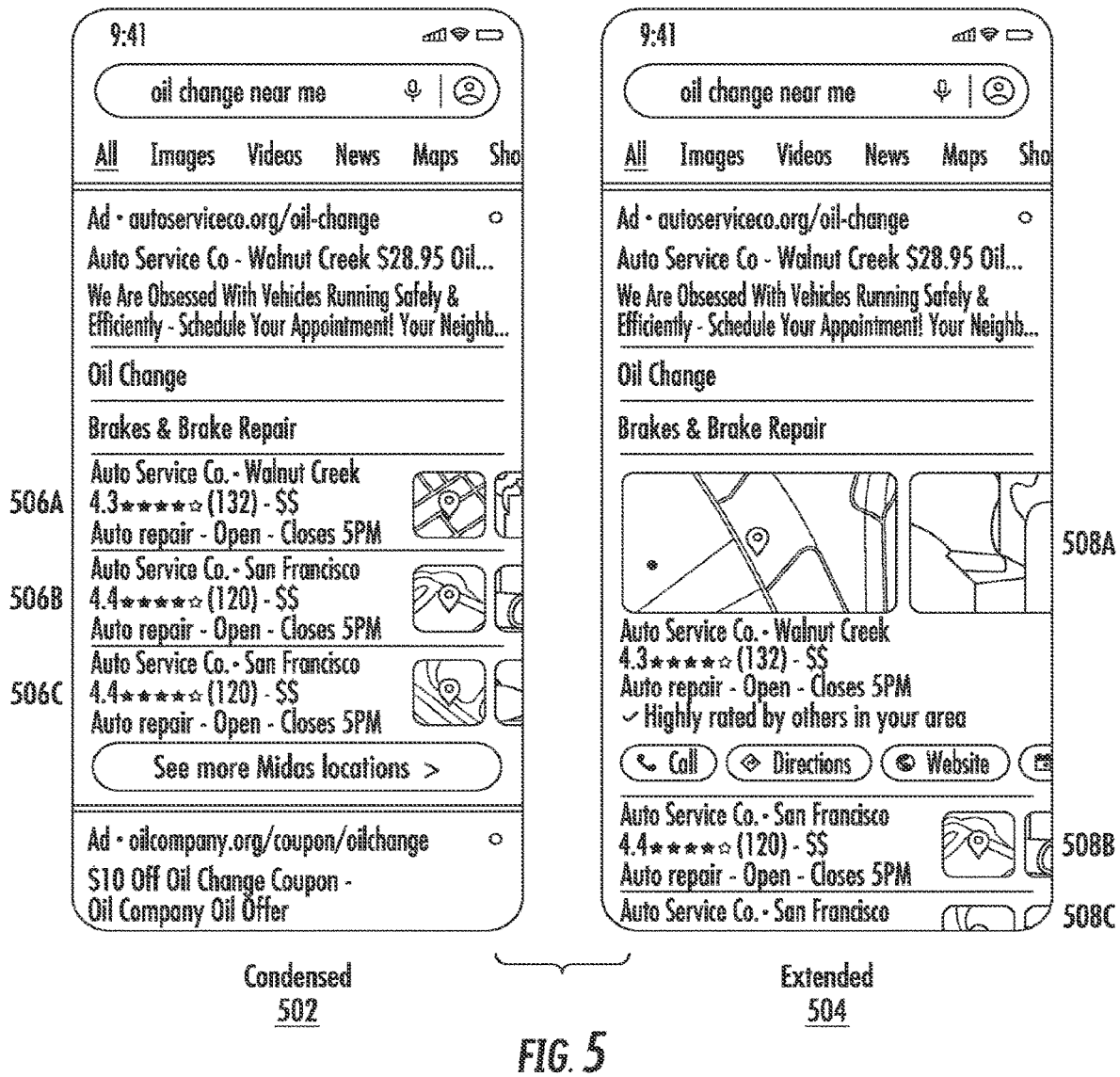
FIG. 5 depicts an illustration of an example instance of multiple uni-card interfaces in parallel according to example embodiments of the present disclosure.

FIG. 5 depicts an illustration of an example instance of multiple uni-card interfaces in parallel according to example embodiments of the present disclosure. In particular, in some implementations, multiple uni-card interfaces may be provided and displayed in a single webpage. For example, multiple uni-card interfaces for multiple specific search results can be provided in parallel to one another.

More specifically, FIG. 5 depicts three initial states 506 in the condensed state 502 of the parallel instance display. A first user input selecting the first specific search result 506A can be received, which can cause a transition to the extended state 504. The second specific search result 506B and the third specific search result 506C can be unselected and may continue to be displayed in an initial state in the extended state 504 as displayed as 508B and 508C. Additionally and/or alternatively, the first specific search result 506A can transition into a second state 508A, which can include a carousel interface including a plurality of tiles that provide more detailed information on the first specific search result 506A.

Figure 9:
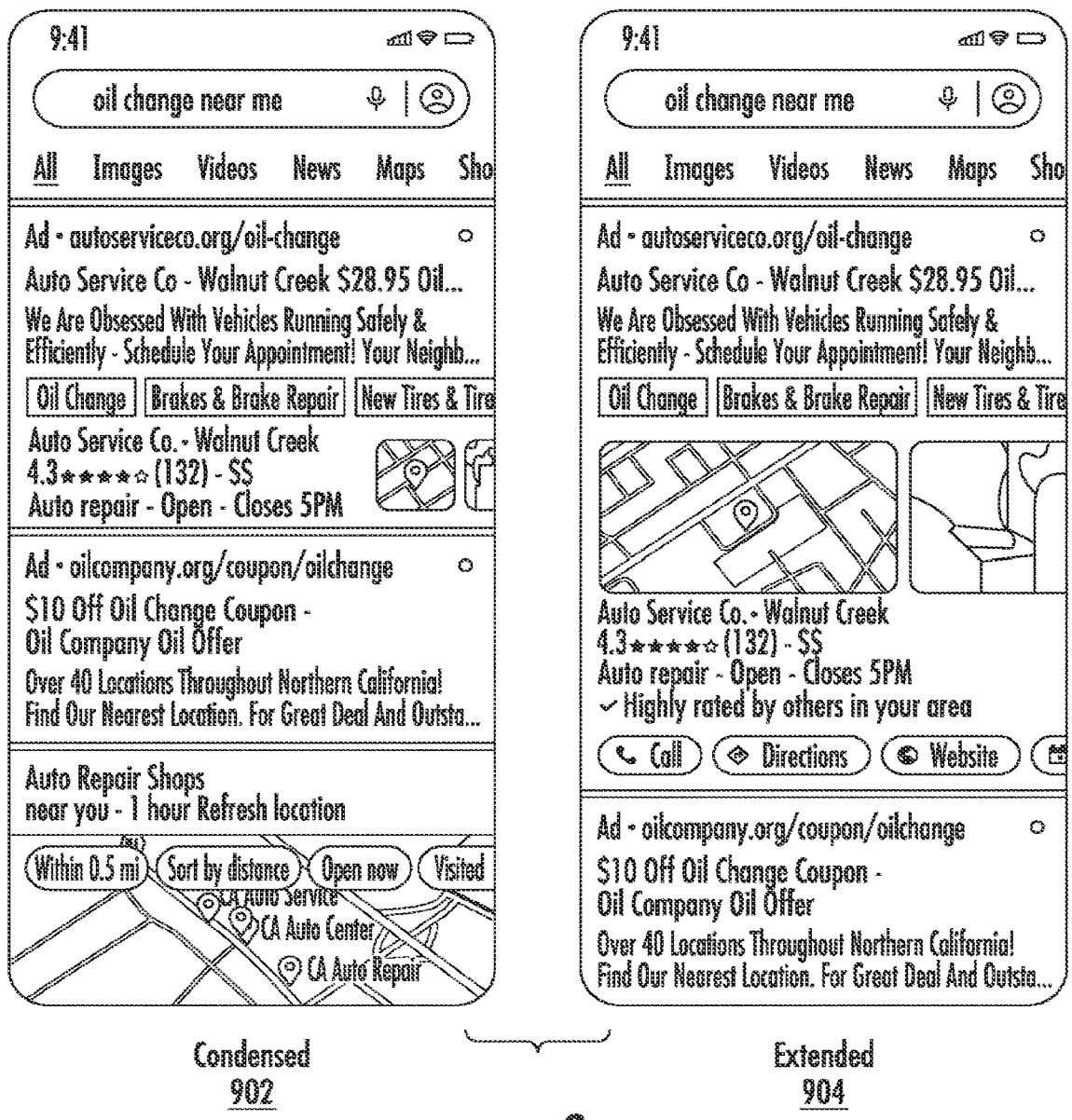
FIG. 9 depicts an illustration of an example uni-card interface layout according to example embodiments of the present disclosure.

FIG. 9 depicts an illustration of an example uni-card interface layout according to example embodiments of the present disclosure. FIG. 9 depicts two states: a first state 902 (e.g., a condensed state) and a second state 904 (e.g., an extended state). The first state 902 can include an initial interface, a textual carousel for specific sub-topics, a general description, and a general title. The second state 904 can be obtained and provided in response to a first user input, which can enlarge the initial carousel of the initial interface into a carousel interface with more detailed information. The second state 904 can further include a second textual carousel with a plurality of action links.

FIG. 10 depicts an illustration of an example interface interaction according to example embodiments of the present disclosure. In particular, the uni-card interface can initially be provided in a first state 1002, or initial state, with an initial interface. The first state 1002 can include a website link 1008 that can be tapped to navigate to a web resource. Interactions with the first state 1002 can further include a tap input to expand to a plurality of uni-card interfaces for a plurality of locations for a search result. Additionally and/or alternatively, the user may tap an initial tile of the initial interface in order to navigate directly to the third state 1006 (e.g., the immersive state). Moreover, a user may input a swipe gesture 1010, which can cause the uni-card interface to transition to a second state 1004 (e.g., an expanded state). The second state 1004 can include a carousel interface, which can include a plurality of tiles. Each of the tiles may be configured to be tapped in order to navigate to the third state 1006 (e.g., the immersive state). Once in the third state 1014, a user may interact with a supplemental content tile 1014 in order to navigate to a webpage of a web resource.

Figure 11:
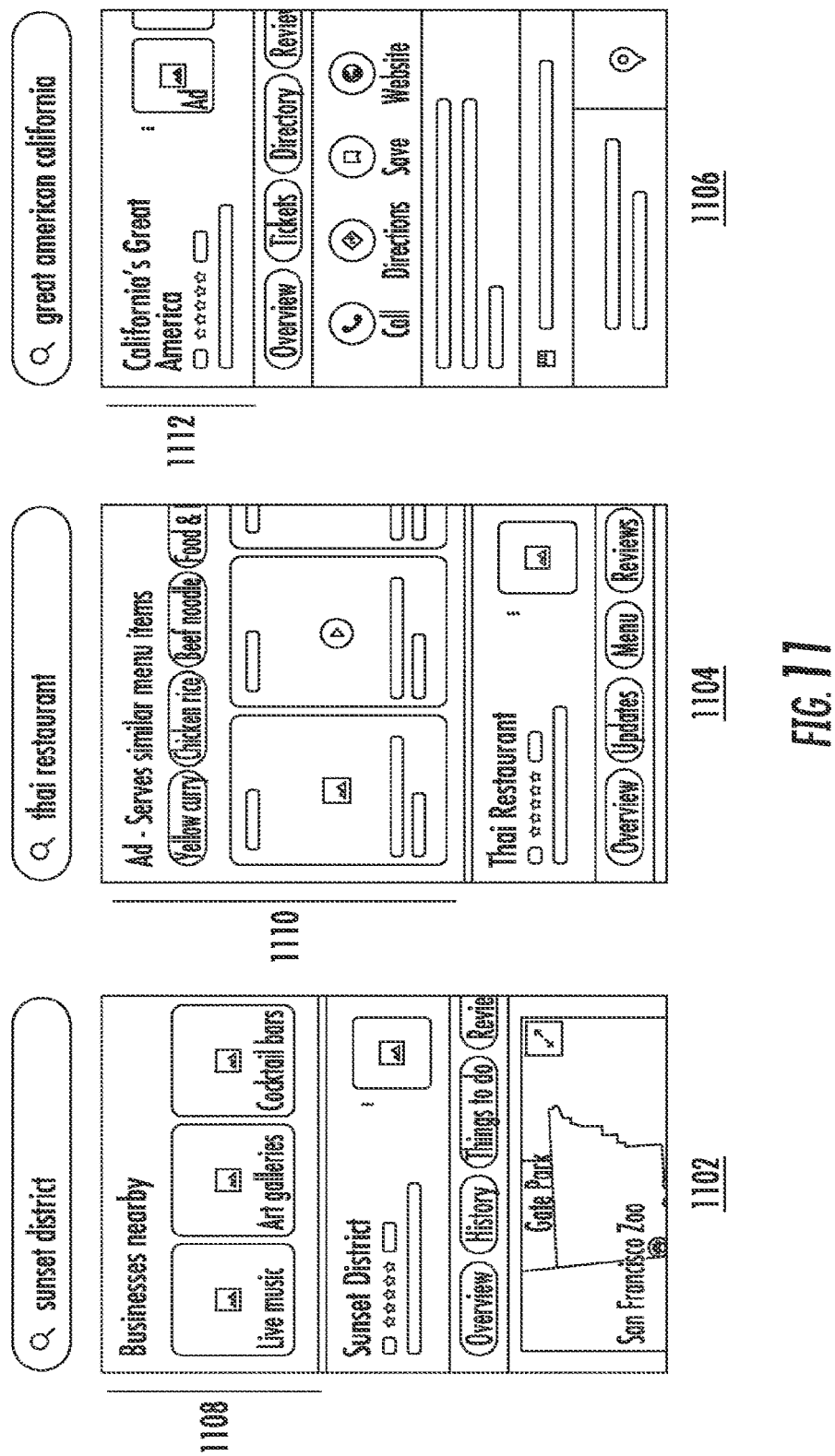
FIG. 11 depicts an illustration of an example uni-card interface layout according to example embodiments of the present disclosure.

FIG. 11 depicts an illustration of an example uni-card interface layout according to example embodiments of the present disclosure. In particular, FIG. 11 depicts three example initial interface templates.

The first example 1102 can include an initial interface 1108 with a plurality of tiles that can grow in size in response to a first user input. The tiles can be descriptive of different sub-topics related to a general topic.

The second example 1104 can include an initial interface 1110, which can include a plurality of multimodal tiles in a carousel and a plurality of text elements in a carousel. The multimodal tiles can be descriptive of different sub-topics and can include text and multimedia elements.

The third example 1106 can include an initial interface 1112, which can include a general title for the search result, a general descriptor, and an initial tile. The initial interface 1112 can be included with a plurality of other elements.

Figure 12:
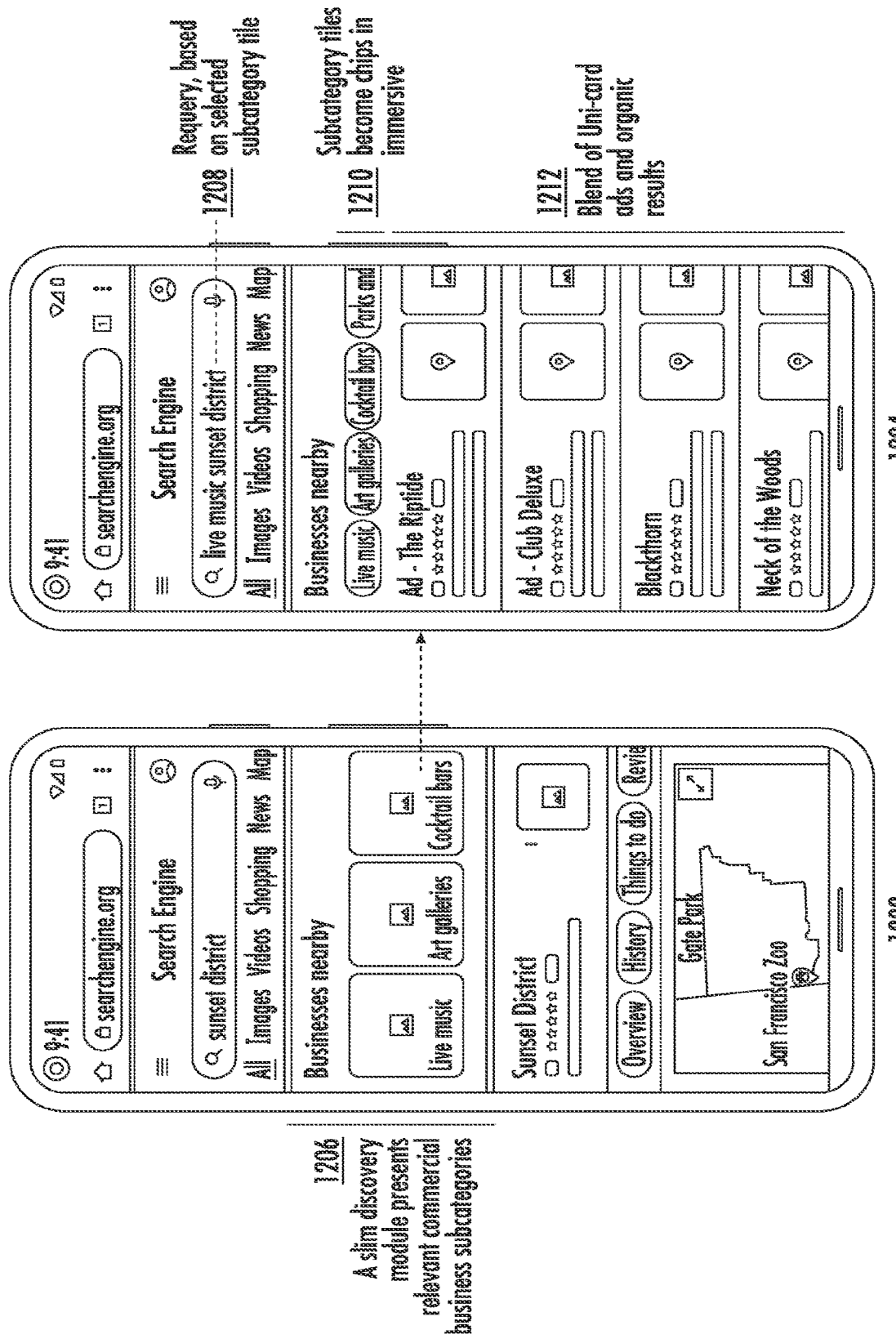
FIG. 12 depicts an illustration of an example uni-card interface layout according to example embodiments of the present disclosure.

FIG. 12 depicts an illustration of an example uni-card interface layout according to example embodiments of the present disclosure. More specifically, FIG. 12 depicts a first state 1202 can include an initial interface 1206, which includes a slim discovery interface which presents relevant commercial business subcategories. The subcategories can include live music, art galleries, and cocktail bars associated with a searched query (e.g., a search query descriptive of a location). A subcategory selection can be received, and a second state 1204 can be obtained and provided. The depicted search query may be modified to further include terms related to the selected subcategory. For example, the search query 1208 may be modified to further include "live music" in response to a selection of the live music subcategory. The subcategories may now be displayed as textual tiles 1210 with an indicator indicating the subcategory that was selected. The second state 1204 can include a plurality of uni-card interfaces 1212 for different specific search results associated with the selected subcategory.

FIG. 13 depicts an illustration of an example stories interface according to example embodiments of the present disclosure. The stories interface can include an optional first state for selecting a subcategory associated with a search query. In the depicted example, the "yellow curry" subcategory is selected. After the subcategory selection, a second state 1302 can be displayed. The second state 1302 can include two carousels 1308. The first carousel can include text elements including an indicator indicating the selected subcategory. The second carousel can include a plurality of tiles, which can include media tiles with text overlay. One or more of the tiles may be story tiles. A story tile may be selected in order to display a third state. The third state can include images and videos displayed in succession for a determined period of time. The third state may include a plurality of disconnected progress bars indicating the progress for a respective visual element.

For example, a first story may include an image story 1304 displayed for a period of time along with location information and actions displayed in a bottom bar 1310. When the period of time elapses for the first story elapses, a second story may be displayed. The second story may include a video story 1306 descriptive of the next content item associated with the subsequent tile in the second state carousel interface.

Figure 14:
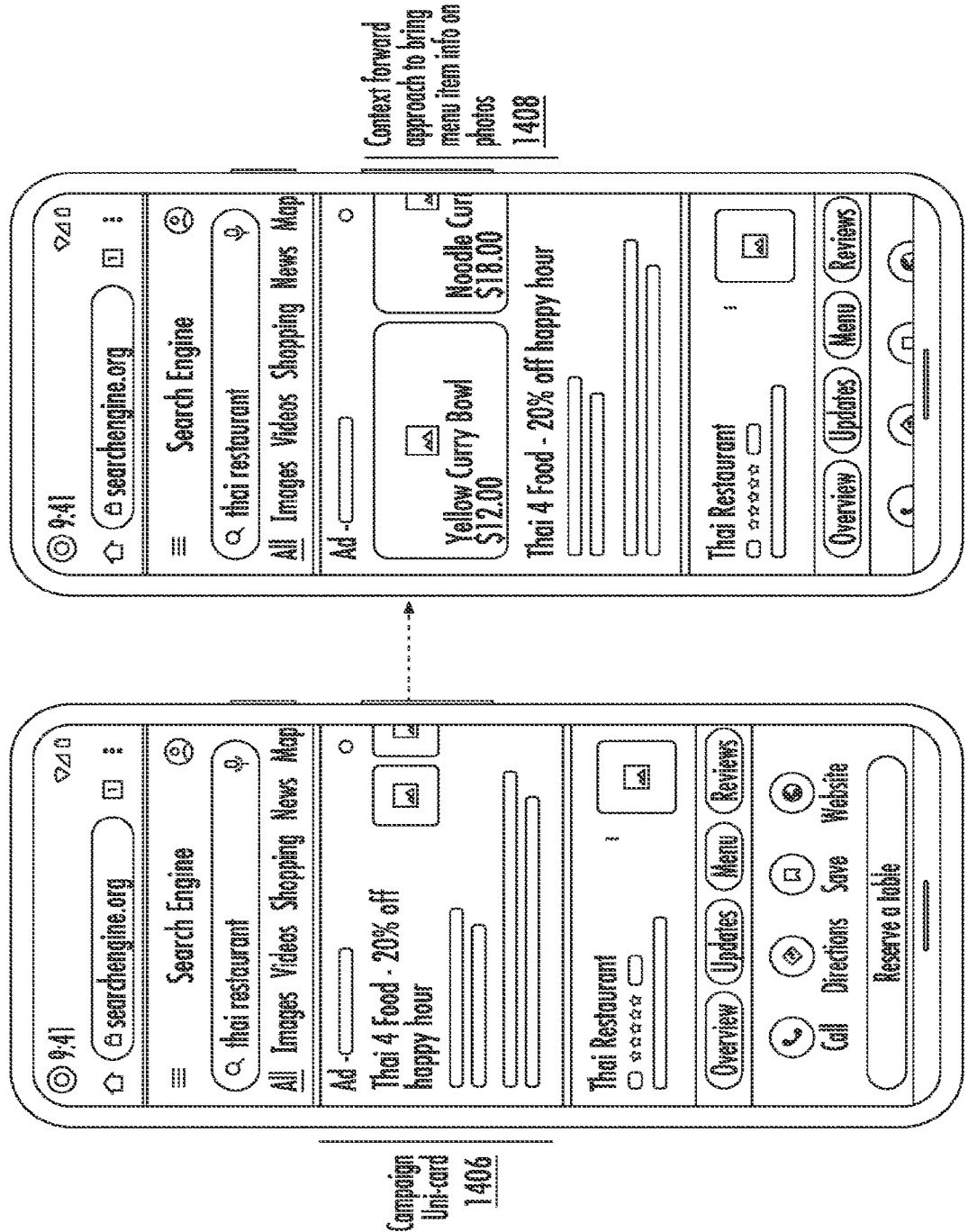
FIG. 14 depicts an illustration of an example context driven interface according to example embodiments of the present disclosure.

FIG. 14 depicts an illustration of an example context driven interface according to example embodiments of the present disclosure. More specifically, in some implementations, the initial state 1402 can include an initial interface for a campaign uni-card 1406. An initial tile can then be selected with a swipe gesture. The input can then be received, and a second state 1404 can be provided. The second state 1404 can include a plurality of tiles 1408 displayed above the general information displayed in the initial interface. In some implementations, the plurality of tiles 1408 can include a context forward approach to bring menu items into photos for displaying sub-topics related to a general restaurant topic.

FIG. 15 depicts an illustration of an example uni-card interface layout according to example embodiments of the present disclosure. The multi-state interface depicted in FIG. 15 can include an initial state 1502, a second state 1504, and a third state 1506. The presentation of the second state 1504 may be dependent on the interaction type 1508 with the initial state 1502. For example, a swipe gesture can cause a second state 1504 to be displayed, while a tap gesture may cause a third state 1506 to be displayed.

The second state 1504 can include a plurality of tiles displayed in a carousel interface. The plurality of tiles may include one or more organic images 1510. The plurality of tiles may be descriptive of different content items and may be generated manually and/or automatically.

The third state 1506 can be navigated to from the initial state 1502 or from the second state 1504. In some implementations, the third state can include a large visual element with textual data overlay and may include an interactive element 1512 to provide an engaging interface with added utility.

FIG. 16 depicts an illustration of an example parallel uni-card interface according to example embodiments of the present disclosure. In particular, FIG. 16 depicts three example interface layouts. The first example 1602 can include parallel instances of a uni-card interface, in which each specific content item of a list collection 1608 may have its own respective uni-card interface.

The second example 1604 can depict an initial state or a second state depending on a provider selection and/or a third party selection. The second example 1604 can include a carousel collection 1610 that can be visually forward. The carousel collection 1610 can include a plurality of multimodal tiles.

The third example 1606 can depict an initial state with a uni-card initial interface 1612 depicting condensed information related to a search result. The condensed information can include a search result general title and general descriptor.

Figure 17:
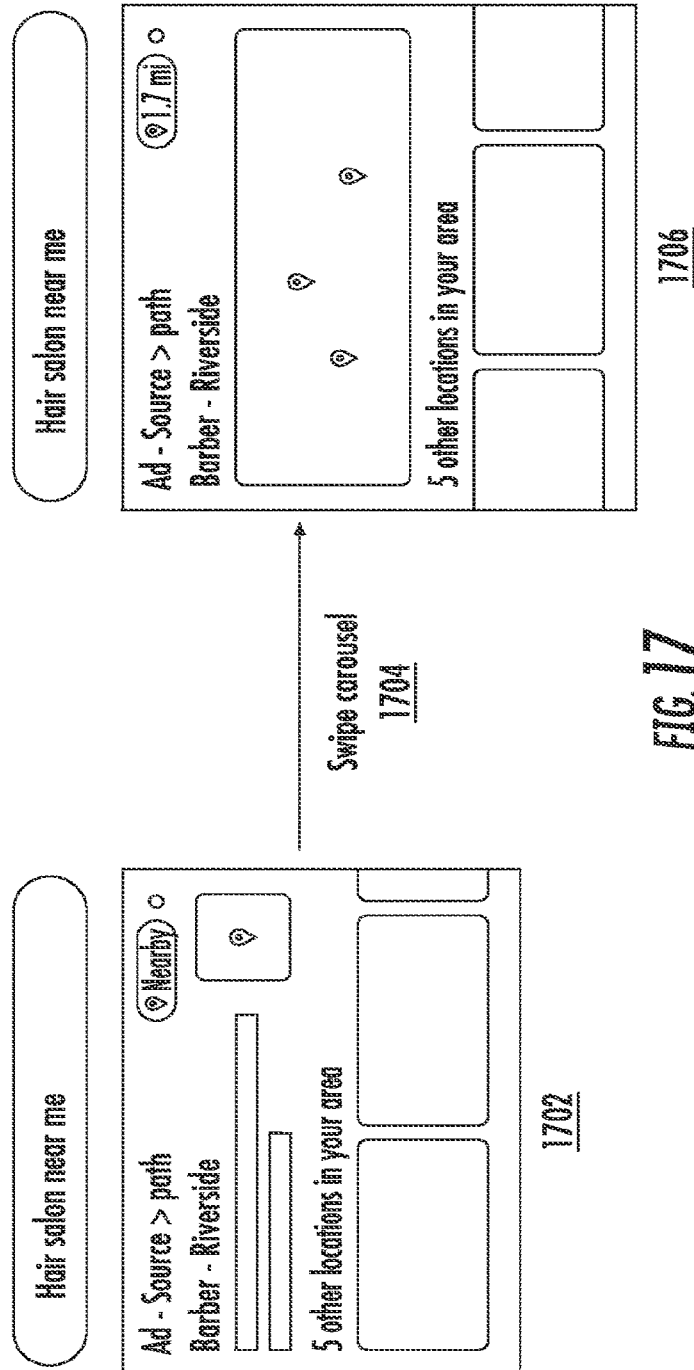
FIG. 17 depicts an illustration of an example carousel interface according to example embodiments of the present disclosure.

FIG. 17 depicts an illustration of an example carousel interface according to example embodiments of the present disclosure. The example carousel interface depicted in FIG. 17 includes a plurality of tiles depicted below a second interface portion. The second interface portion initially 1702 includes general information on a topic (e.g., a store name, a store description, and a small initial tile). The carousel interface can be swiped 1704 through via one or more user inputs. A user may select a tile, which can trigger the display of a large supplemental content element in the second portion of the interface as depicted in 1706. The supplemental content element can be generated and provided based on a selected particular tile. In some implementations, the supplemental content element may display a map element with one or more pins indicating one or more locations of interest.

Figure 18:
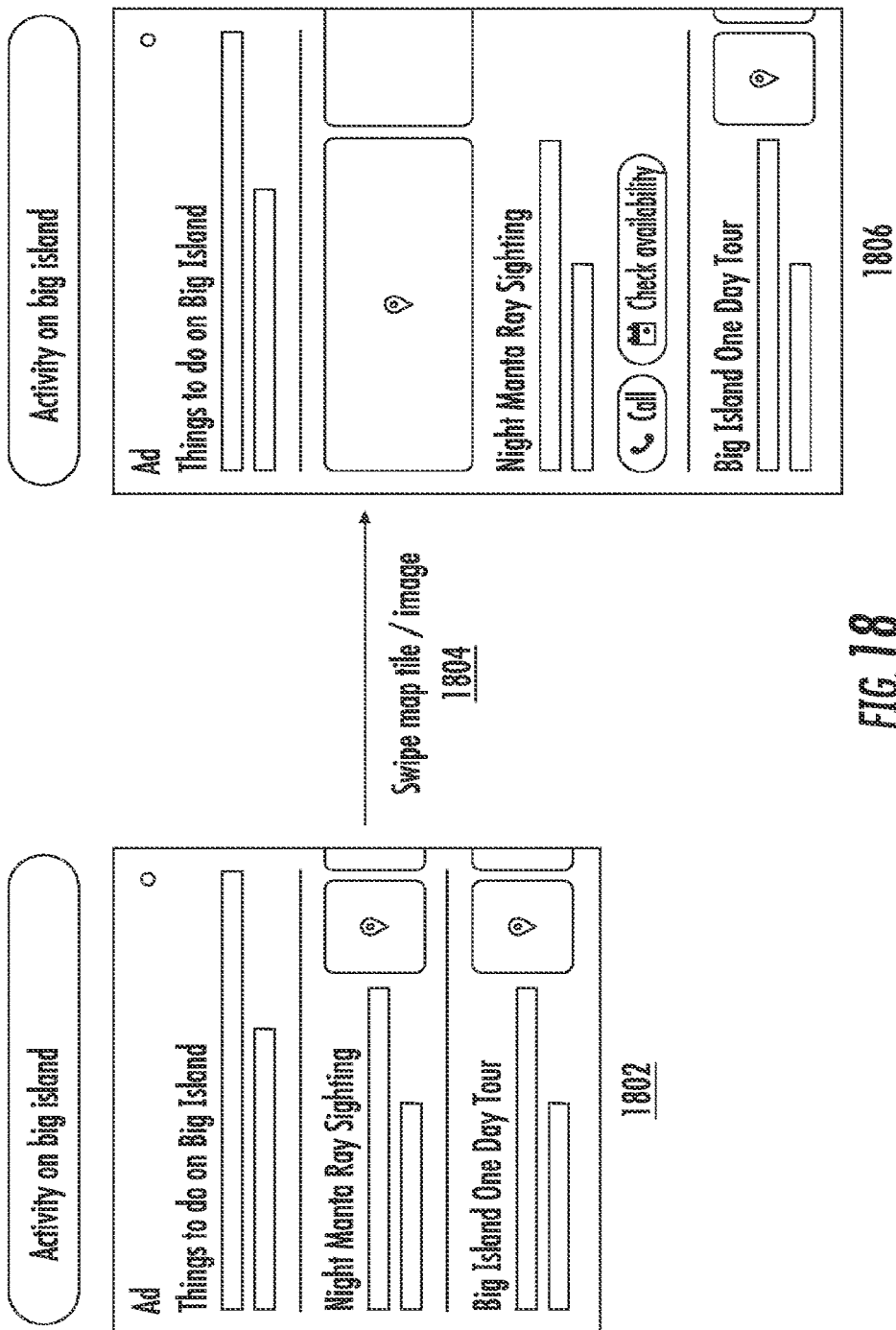
FIG. 18 depicts an illustration of an example map tile transition according to example embodiments of the present disclosure.

FIG. 18 depicts an illustration of an example map tile transition according to example embodiments of the present disclosure. At 1802, a plurality of uni-card interfaces are depicted descriptive of different sub-topics to an overall gadget topic. A swipe gesture 1804 can then be received to provide an expanded view of a selected sub-topic as depicted in 1806. In particular, a carousel interface for the sub-topic may be displayed.

Figure 19:
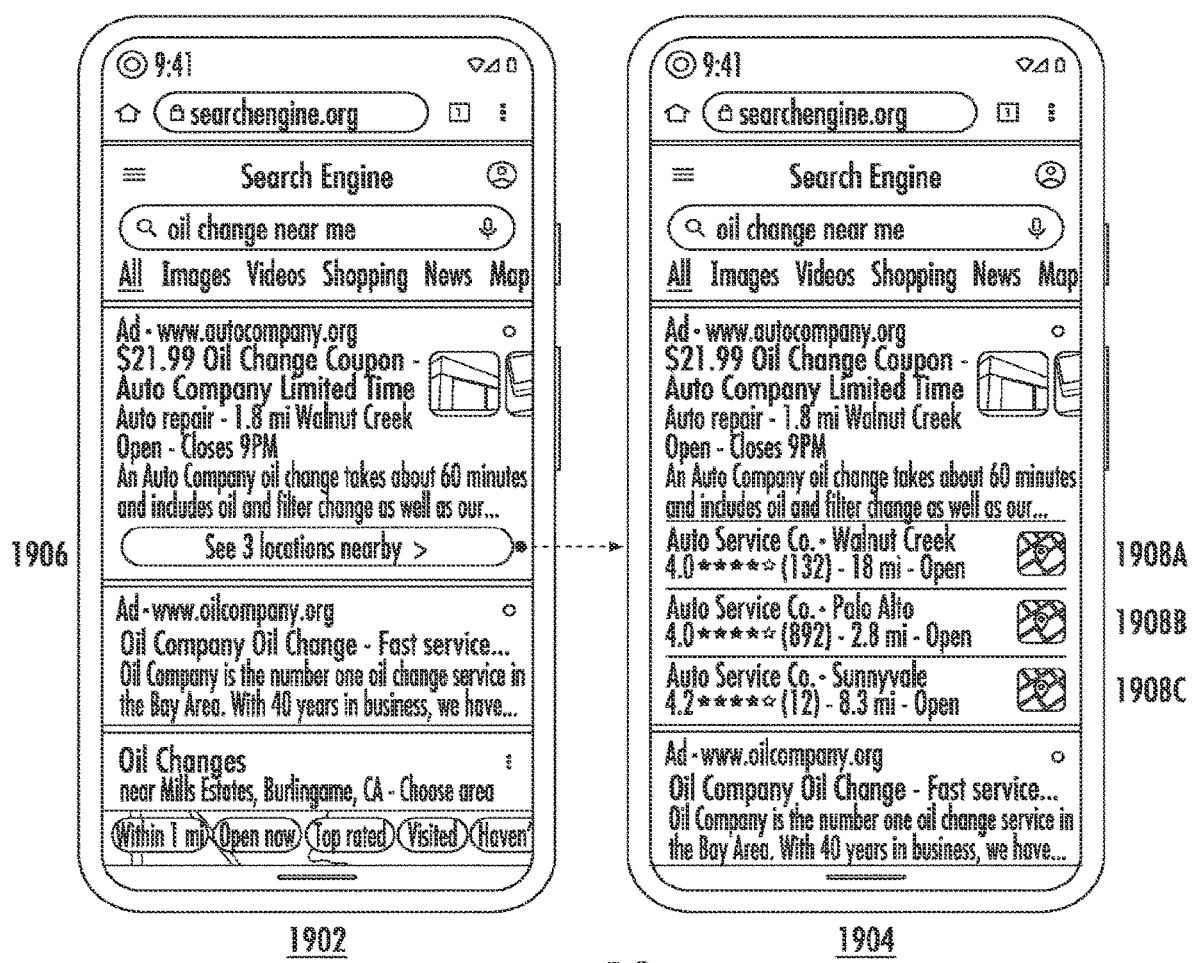
FIG. 19 depicts an illustration of an example options expansion interface component according to example embodiments of the present disclosure.

FIG. 19 depicts an illustration of an example options expansion interface component according to example embodiments of the present disclosure. In some implementations, the systems and methods can further include an interaction with an options expansion interface. The first state 1902 of the options expansion interface may include an interactive element 1906, which when selected can cause the interface to transition to a second state 1904, which can include a plurality of uni-card interfaces 1908 displayed in response to the selection of the interactive element 1906. The plurality of uni-card interfaces 1908, 1908B, & 1908C can include information on different locations for a respective search result.

Figure 20:
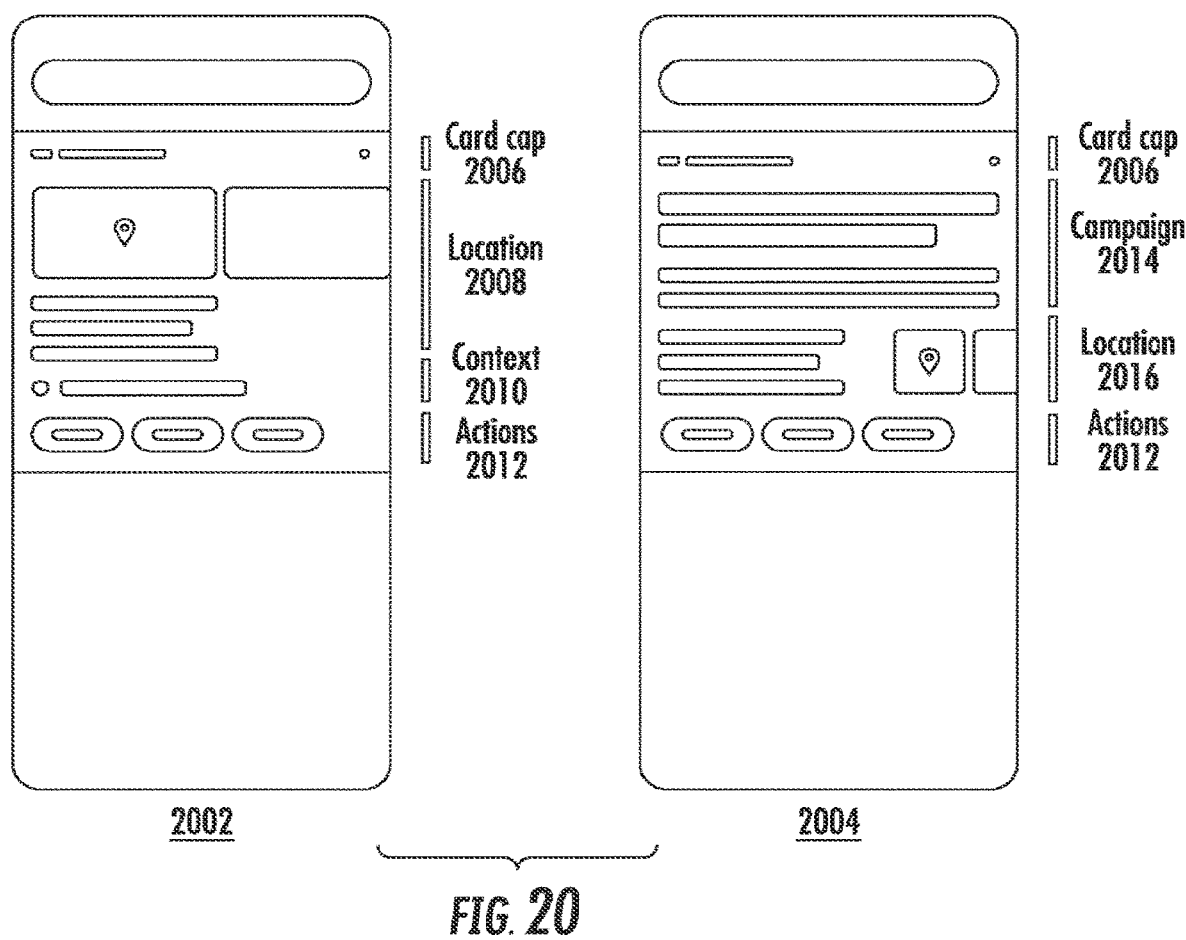
FIG. 20 depicts an illustration of example components of a uni-card interface template according to example embodiments of the present disclosure.

FIG. 20 depicts an illustration of example components of a uni-card interface template according to example embodiments of the present disclosure. The example templates can include a variety of elements of a variety of different sizes. For example, the first example template 2002 can include a card cap element 2006 which can be descriptive of a topic or sub-topic, a location element 2006 which can be descriptive of a location for a topic or sub-topic, a context element 2010 which can be descriptive of a search context, and an actions element 2002 which can include a plurality of interactive action elements for completing a variety of different actions.

Moreover, the second example template 2004 can include a card cap element 2006, an actions element 2012, a campaign element 2014 which can include textual information on a topic or sub-topic, and a condensed location element 2012 which can include the information of a location element 2008 but in a condensed version.

FIG. 21 depicts an illustration of an example size adjustment transition according to example embodiments of the present disclosure. At 2102, an initial state is displayed with a plurality of multimodal tiles in an initial interface. An interaction with the initial interface can trigger the uni-card interface to transition from the initial state to the second state. At 2104, the second state is displayed with a plurality of multimodal tiles displayed as a larger size when compared to the initial state. The second state can further include one or more of the plurality of tiles being larger than the other tiles in the carousel based on a user interaction or a location in the carousel. For example, at 2104, a middle tile is provided as a larger size based on the middle tile being a central tile in the display at that given time. As a user navigates through the carousel, different tiles may be enlarged or shrunk in response to new tiles being central in the display.

Example Methods

Figure 6:
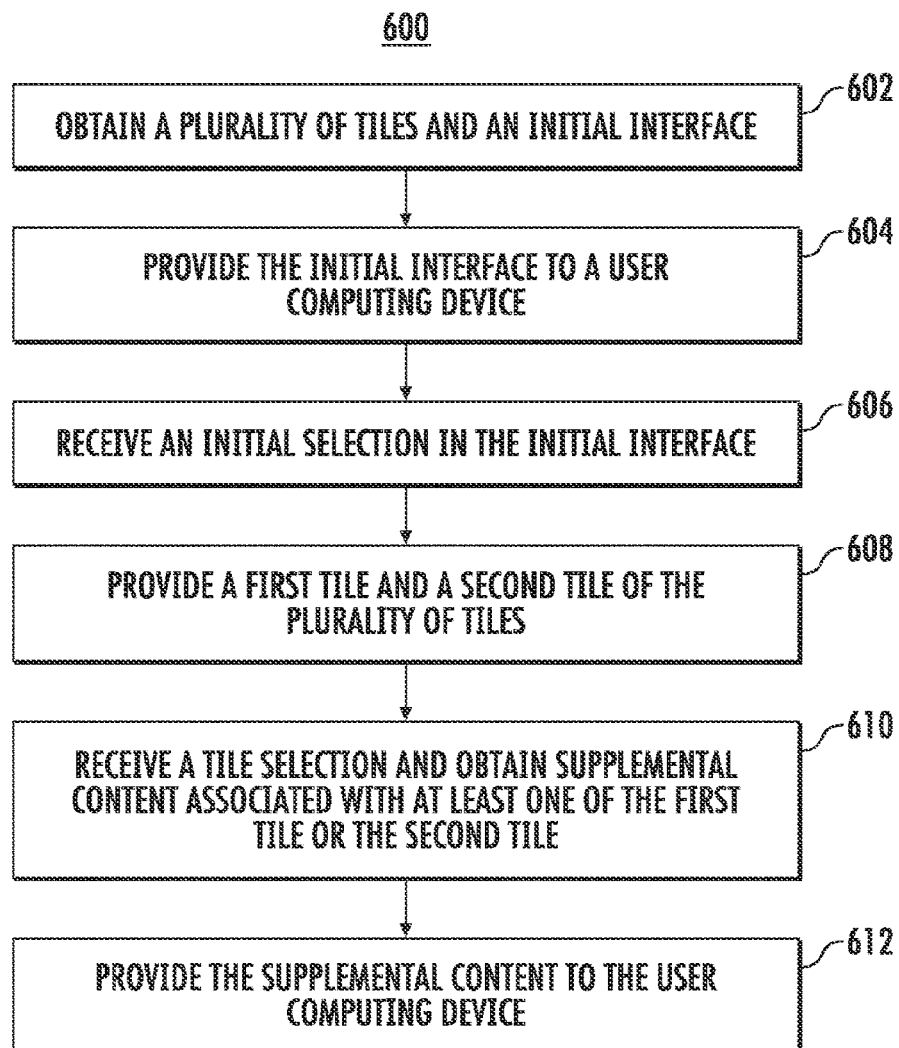
FIG. 6 depicts a flow chart diagram of an example method to perform uni-card interface display according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain a plurality of tiles and an initial interface. The plurality of tiles can be associated with a plurality of respective content items. In some implementations, the initial interface can be associated with the plurality of content items. The plurality of tiles and the initial interface can be obtained in response to receiving a search query. The search query can be associated with a topic, and each of the plurality of content items may be associated with the topic being searched.

At 604, the computing system can provide the initial interface to a user computing device. The initial interface can be provided as part of a search results page in which the initial interface may be provided adjacent to search results associated with a searched topic.

At 606, the computing system can receive an initial selection in the initial interface. The initial selection can be a first user input. In some implementations, the initial selection can include a gesture input (e.g., a swipe gesture associated with the initial interface).

At 608, the computing system can provide a first tile and a second tile of the plurality of tiles. The first tile and the second tile can be associated with specific details related to a topic being searched (e.g., location data for a store being searched or image data associated with a menu item for a searched restaurant). In some implementations, the first tile may be a tile displayed with the initial interface at a decreased size, which can then increase in size in response to the initial selection.

At 610, the computing system can receive a tile selection and obtain supplemental content associated with at least one of the first tile or the second tile. The tile selection may be a second user input (e.g., a tap input selecting a particular tile of the plurality of tiles). The supplemental content can be associated with the selected tile and may include more detailed data related to the content item associated with the selected tile.

At 612, the computing system can provide the supplemental content to the user computing device. In some implementations, a further user input may be received, and the system may redirect a user computing system to a content item landing page in response to the user input.

Figure 7:
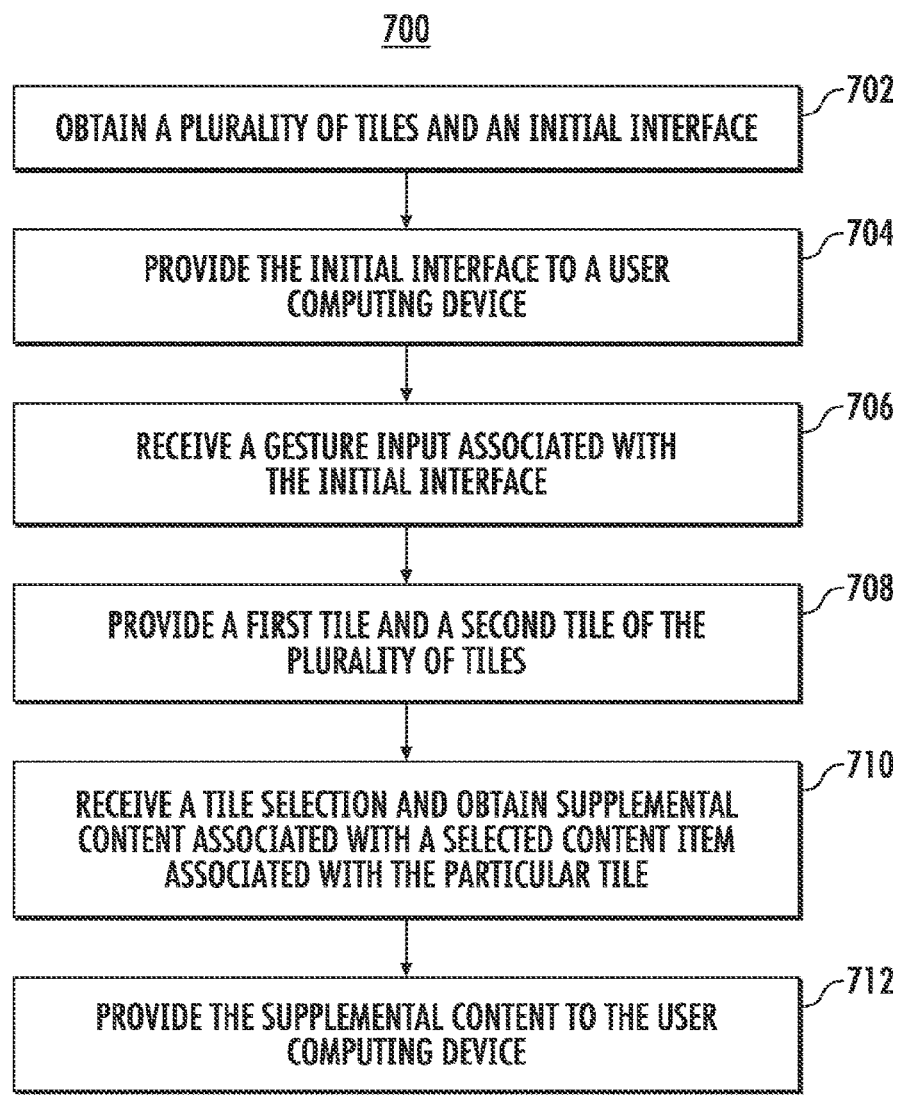
FIG. 7 depicts a flow chart diagram of an example method to perform uni-card interface display according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain a plurality of tiles and an initial interface. The plurality of tiles can be associated with a plurality of respective media content items. The initial interface can be generated based on the plurality of respective media content items.

At 704, the computing system can provide the initial interface to a user computing device. The initial interface can include one or more graphical elements indicating a carousel interface may be provided in response to a selection.

At 706, the computing system can receive a gesture input associated with the initial interface. The gesture input can select a portion of the initial interface. In some implementations, the gesture input can include a swipe gesture over a portion of the initial interface.

At 708, the computing system can provide a first tile and a second tile of the plurality of tiles. The first tile and the second tile can be provided in a carousel interface. The carousel interface can be configured to automatically cycle and/or may cycle based on manual inputs by a user. In some implementations, the carousel interface can be scrolled through in response to swipe gestures by a user.

At 710, the computing system can receive a tile selection and obtain supplemental content associated with a selected content item associated with the particular tile. The tile selection can include a user input (e.g., a second user input) selecting a particular tile of the plurality tiles. The tile selection can include a tap input, a speech input, and/or a determined input based on a specified amount of time elapsing with the particular tile being displayed. The supplemental content can include map data and routing data for reaching a desired location associated with a particular tile.

At 712, the computing system can provide the supplemental content to the user computing device. The supplemental content can be provided as part of a story-based display, may be provided as a slide deck presentation, or may be provided as an enlarged tile.

Figure 8:
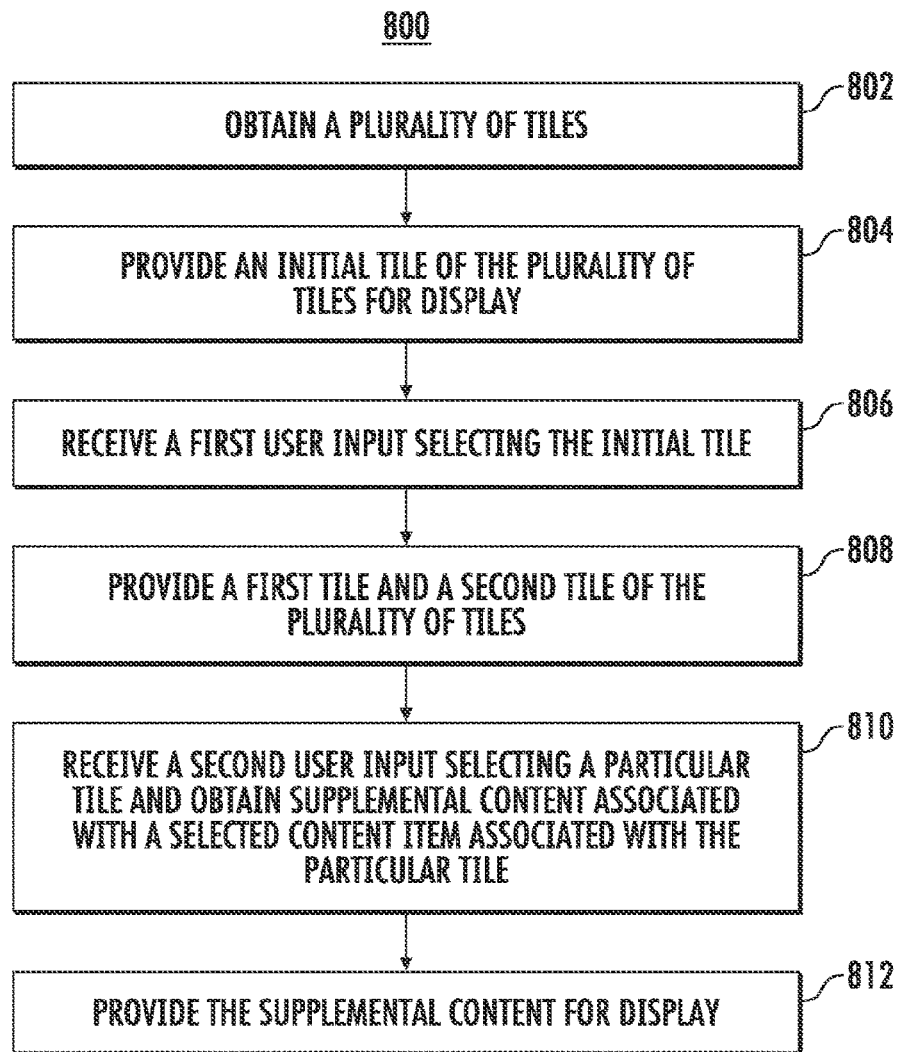
FIG. 8 depicts a flow chart diagram of an example method to perform uni-card interface display according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain a plurality of tiles. The plurality of tiles can be associated with a plurality of respective content items. The plurality of content items can be associated with a topic, and each of the content items may be associated with a specific sub-topic.

At 804, the computing system can provide an initial tile of the plurality of tiles for display. The initial tile can be of a first size.

At 806, the computing system can receive a first user input selecting the initial tile. The first user input can include a tap input, a gesture input, and/or a variety of other inputs.

At 808, the computing system can provide a first tile and a second tile of the plurality of tiles. The first tile and the second tile can be provided in response to the first user input. The first tile and the second tile can be displayed as a second size. The second size can be larger than the first size. In some implementations, the initial tile can be displayed as the second size with the first tile and the second tile. The tiles may be displayed with a carousel interface.

At 810, the computing system can receive a second user input selecting a particular tile and obtain supplemental content associated with a selected content item associated with the particular tile. The particular tile can include one or more of the initial tile, the first tile, or the second tile. In some implementations, the supplemental content can include data obtained from one or more content items associated with the particular tile.

At 812, the computing system can provide the supplemental content for display. Providing the supplemental content for display can involve transmitting the supplemental content to a user computing system.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for content display, the method comprising:
    obtaining, by a computing system comprising one or more processors, a plurality of tiles and an initial interface, wherein each of the plurality of tiles is associated with a respective content item of a plurality of content items, wherein each of the plurality of tiles comprise a respective media snippet, wherein the respective media snippet comprises image data associated with the respective content item, and wherein the initial interface is associated with the plurality of content items;
    providing, by the computing system, the initial interface to a user computing device, wherein the initial interface comprises an initial tile provided for display at a first size;
    receiving, by the computing system, an initial selection in the initial interface;
    providing, by the computing system, a first tile and a second tile of the plurality of tiles, wherein the first tile and the second tile are provided in a carousel interface, wherein the first tile and the second tile are provided for display at a second size, wherein the second size is larger than the first size;
    receiving, by the computing system, a tile selection, wherein the tile selection comprises a user input selecting at least one of the first tile or the second tile;
    obtaining, by the computing system, supplemental content associated with a selected content item associated with at least one of the first tile or the second tile; and
    providing, by the computing system, the supplemental content to the user computing device, wherein the supplemental content is provided for display at a third size, wherein the third size is larger than the second size.

2. The computer-implemented method of claim 1, wherein obtaining the plurality of tiles and the initial interface comprises:
    obtaining, by the computing system, the plurality of content items;
    generating, by the computing system, the plurality of tiles based at least in part on the plurality of content items.

3. The computer-implemented method of claim 2, wherein generating the plurality of tiles comprises obtaining a media snippet from each of the plurality of content items.

4. The computer-implemented method of claim 1, wherein the plurality of content items are obtained in response to a request, wherein the request is associated with a particular topic, and wherein the plurality of content items are associated with the particular topic.

5. The computer-implemented method of claim 1, wherein the supplemental content comprises a graphical map.

6. The computer-implemented method of claim 5, wherein the graphical map comprises one or more indicators associated with one or more of the plurality of content items.

7. The computer-implemented method of claim 1, wherein obtaining, by the computing system, the supplemental content associated with the selected content item associated with at least one of the first tile or the second tile comprises:
   obtaining, by the computing system, location data associated with a user; and
   generating, by the computing system, location-specific supplemental content based on the location data and the selected content item.

8. The computer-implemented method of claim 1, wherein the initial interface comprises an initial tile associated with at least one of the plurality of content items; and
   wherein the initial selection comprises a selection of the initial tile.

9. The computer-implemented method of claim 1, wherein the initial interface comprises general information on a topic, wherein the plurality of content items comprise specific information on a plurality of respective sub-topics, and wherein the supplemental content comprises detailed information on a particular sub-topic.

10. The computer-implemented method of claim 1, wherein the initial interface, the first tile, the second tile, and the supplemental content are provided in a singular user interface.

11. The computer-implemented method of claim 10, wherein the singular user interface comprises a search engine interface.

12. The computer-implemented method of claim 1, wherein the initial selection is determined based on a gesture input, and wherein the gesture input comprises a swipe gesture.

13. A computing system for information retrieval and display, the computing system comprising:
   one or more processors; and
   one or more non-transitory computer-readable media that collectively store instructions that, when executed by the one or more processors, cause the computing system to perform operations, the operations comprising:
      obtaining a plurality of tiles and an initial interface, wherein each of the plurality of tiles is associated with a respective media content item of a plurality of content items, wherein each of the plurality of tiles comprise a respective media snippet, wherein the respective media snippet comprises image data associated with the respective content item, and wherein the initial interface is associated with the plurality of content items;
      providing the initial interface to a user computing device, wherein the initial interface comprises an initial tile provided for display at a first size;
      receiving a gesture input associated with the initial interface;
      providing a first tile and a second tile of the plurality of tiles, wherein the first tile and the second tile are provided in a carousel interface, wherein the first tile and the second tile are provided for display at a second size, wherein the second size is larger than the first size;
      receiving a tile selection, wherein the tile selection comprises a user input selecting a particular tile of the plurality of tiles;
      obtaining supplemental content associated with a selected content item associated with the particular tile; and
      providing the supplemental content to the user computing device, wherein the supplemental content is provided for display at a third size, wherein the third size is larger than the second size.

14. The computing system of claim 13, wherein the first tile is descriptive of a map, wherein the map tile is descriptive of a location associated with a location content item, and wherein the second tile is descriptive of an image.

15. One or more non-transitory computer-readable media that collectively store instructions that, when executed by one or more computing devices, cause the one or more computing devices to perform operations, the operations comprising:
   obtaining a plurality of tiles, wherein each of the plurality of tiles is associated with a respective content item of a plurality of content items, and wherein each of the plurality of tiles comprise a respective media snippet, wherein the respective media snippet comprises image data associated with the respective content item;
   providing an initial tile of the plurality of tiles for display, wherein the initial tile is provided for display at a first size;
   receiving a first user input selecting the initial tile;
   in response to receiving the first user input selecting the initial tile, providing a first tile and a second tile of the plurality of tiles, wherein the initial tile, the first tile, and the second tile are provided in a carousel interface, wherein the initial tile, the first tile, and the second tile are provided for display at a second size, wherein the second size is larger than the first size;
   receiving a second user input selecting a particular tile, wherein the particular tile comprises at least one of the initial tile, the first tile, or the second tile;
   obtaining supplemental content associated with a selected content item associated with the particular tile; and
   providing the supplemental content for display, wherein the supplemental content is provided for display at a third size, wherein the third size is larger than the second size.

16. The one or more non-transitory computer-readable media of claim 15, further comprising:
   receiving a third user input associated with the carousel interface; and
   adjusting a display size for at least one of the initial tile, the first tile, or the second tile.

17. The one or more non-transitory computer-readable media of claim 15, wherein the carousel interface comprises a first carousel and a second carousel, wherein the first carousel comprises a plurality of graphical tiles, and wherein the second carousel comprises a plurality of textual tiles.

18. The one or more non-transitory computer-readable media of claim 15, wherein the initial tile, the first tile, the second tile, and the supplemental content are provided in a self-contained gadget of a search results interface, wherein the search results interface comprises a plurality of search results during the display of the initial tile, the first tile, the second tile, and the supplemental content.

19. The one or more non-transitory computer-readable media of claim 15, further comprising:
adjusting a display size of the initial tile in response to the first user input; and
wherein the supplemental content comprises map data displayed in a larger display size than the initial tile, the first tile, and the second tile.

20. The one or more non-transitory computer-readable media of claim 19, wherein the map data comprises route data and traffic data overlaid over a map.

* * * * *